(12) United States Patent
Chen

(10) Patent No.: US 11,330,900 B2
(45) Date of Patent: May 17, 2022

(54) AUTO-LOCKING ADJUSTABLE BAR AND STRUCTURE HAVING SAME

(71) Applicant: Inno-Sports Co., Ltd., Xiamen (CN)

(72) Inventor: Renhua Chen, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 92 days.

(21) Appl. No.: 17/000,661

(22) Filed: Aug. 24, 2020

(65) Prior Publication Data
US 2021/0062842 A1    Mar. 4, 2021

(30) Foreign Application Priority Data

Aug. 30, 2019    (CN) .......................... 201921436899.6
Oct. 9, 2019    (CN) .......................... 201921680777.1

(51) Int. Cl.
| | |
|---|---|
| *A47B 9/16* | (2006.01) |
| *A47B 9/14* | (2006.01) |
| *A47B 3/00* | (2006.01) |
| *F16B 7/10* | (2006.01) |
| *F16M 11/38* | (2006.01) |
| *A47C 19/04* | (2006.01) |

(52) U.S. Cl.
CPC ................ *A47B 9/16* (2013.01); *A47B 3/002* (2013.01); *A47B 9/14* (2013.01); *F16B 7/105* (2013.01); *F16M 11/38* (2013.01); *A47B 2003/006* (2013.01); *A47C 19/04* (2013.01); *F16M 2200/028* (2013.01)

(58) Field of Classification Search
CPC .. A47B 9/16; A47B 9/14; A47B 3/002; A47B 2003/006; F16B 7/105; F16M 11/38; F16M 2200/028; A47C 19/04
See application file for complete search history.

(56) References Cited

U.S. PATENT DOCUMENTS

| | | |
|---|---|---|
| 202,685 A | 4/1878 | White |
| 324,843 A | 8/1885 | Horton |
| 337,415 A | 3/1886 | McKeough |
| 893,364 A | 7/1908 | Piaser |
| 1,063,642 A | 6/1913 | Birdsell |
| 1,196,253 A | 8/1916 | Lovvy |

(Continued)

FOREIGN PATENT DOCUMENTS

| | | |
|---|---|---|
| CN | 201767333 U | 3/2011 |
| CN | 204336376 U | 5/2015 |

(Continued)

*Primary Examiner* — Anita M King
(74) *Attorney, Agent, or Firm* — Morgan, Lewis & Bockius LLP

(57) ABSTRACT

Disclosed are adjustable bars and structures having adjustable bars. An adjustable bar includes an inner bar, an outer bar and a locking/unlocking mechanism to control relative movement of the inner and outer bars. The locking/unlocking mechanism includes a locking pin to be selectively inserted into a restriction hole of the outer tubular bar and a restriction member of the inner bar, thereby selectively restricting relative movement of the inner and outer bars in at least one direction. The locking/unlocking mechanism also includes a feature to prevent accidental release of the locking pin from the restriction member. Structures having such adjustable bars are easy and safer to use.

20 Claims, 34 Drawing Sheets

(56) References Cited

U.S. PATENT DOCUMENTS

| | | |
|---|---|---|
| 1,599,971 A | 9/1926 | Melson |
| 2,136,569 A | 11/1938 | Trimpi |
| 3,027,209 A | 3/1962 | Nielsen |
| 3,188,138 A | 6/1965 | Lockshin |
| 3,368,504 A | 2/1968 | Cohen |
| 4,191,111 A | 3/1980 | Emmert |
| 4,597,553 A | 7/1986 | Rorabaugh |
| 4,773,108 A | 9/1988 | Leever |
| 5,325,794 A | 7/1994 | Hontani |
| 5,331,725 A | 7/1994 | Chou |
| 6,062,589 A | 5/2000 | Cheng |
| 6,223,628 B1 | 5/2001 | Barron |
| 6,508,262 B1 | 1/2003 | Takayama |
| 6,575,656 B2 | 6/2003 | Suh |
| 6,843,183 B2 | 1/2005 | Strong |
| 6,938,927 B1 | 9/2005 | Martin |
| 7,059,254 B2 | 6/2006 | Strong et al. |
| 7,066,676 B2 | 6/2006 | Tsai |
| 7,096,799 B2 | 8/2006 | Strong et al. |
| 7,097,380 B2 | 8/2006 | Lee |
| 7,144,078 B2 | 12/2006 | Hsieh |
| 7,171,910 B2 | 2/2007 | Neunzert et al. |
| 7,428,872 B2 | 9/2008 | Strong et al. |
| 7,475,643 B2 | 1/2009 | Haney et al. |
| 7,475,644 B2 | 1/2009 | Strong et al. |
| 7,634,969 B2 | 12/2009 | Neunzert et al. |
| 7,640,870 B2 | 1/2010 | Strong et al. |
| 7,644,667 B2 | 1/2010 | Strong et al. |
| 7,735,431 B2 | 6/2010 | Neunzert et al. |
| 7,849,867 B2 | 12/2010 | Takayama |
| 7,874,303 B2 | 1/2011 | Xie |
| 8,006,630 B2 | 8/2011 | Strong et al. |
| 8,033,228 B2 | 10/2011 | Haney et al. |
| 8,042,475 B2 | 10/2011 | Larcom et al. |
| 8,156,875 B2 | 4/2012 | Neunzert et al. |
| 8,302,541 B2 | 11/2012 | Haney et al. |
| 8,342,107 B2 | 1/2013 | Mover et al. |
| 8,534,205 B1 | 9/2013 | Johnson et al. |
| 8,578,865 B2 | 11/2013 | Haney et al. |
| 8,622,007 B2 | 1/2014 | Peery et al. |
| 8,707,478 B2 | 4/2014 | Jin |
| 8,746,155 B2 | 6/2014 | Haney et al. |
| 8,757,069 B2 | 6/2014 | Peery et al. |
| 8,806,677 B1 | 8/2014 | Bartelsmeyer |
| 8,856,984 B1 | 10/2014 | Donham |
| 8,888,123 B1 | 11/2014 | Cheng |
| 9,027,952 B2 | 5/2015 | Zhu |
| 9,107,509 B2 | 8/2015 | Lee |
| D748,418 S | 2/2016 | Johnson et al. |
| 9,248,072 B2 | 2/2016 | Wu |
| 9,254,046 B1 | 2/2016 | Arenstein |
| 9,277,808 B2 | 3/2016 | Cai et al. |
| 9,314,386 B1 | 4/2016 | Boyd |
| D756,694 S | 5/2016 | Johnson et al. |
| 9,351,563 B2 | 5/2016 | Bennett et al. |
| 9,456,698 B2 | 10/2016 | Oh |
| 9,532,645 B1 | 1/2017 | Lin |
| 9,895,003 B2 | 2/2018 | Choi |
| 9,907,405 B2 | 3/2018 | An |
| 10,021,986 B1 | 7/2018 | Lin |
| 10,123,629 B2 | 11/2018 | Choi |
| 10,125,801 B2 | 11/2018 | Wilson |
| 10,285,506 B2 | 5/2019 | Choi |
| 10,470,561 B2 | 11/2019 | Clegg et al. |
| 2003/0009848 A1 | 1/2003 | Kuo |
| 2003/0089286 A1 | 5/2003 | Wang |
| 2005/0097829 A1 | 5/2005 | Seo |
| 2005/0241550 A1 | 11/2005 | Neunzert |
| 2005/0274304 A1 | 12/2005 | Strong |
| 2005/0279260 A1 | 12/2005 | Stanford |
| 2006/0062632 A1 | 3/2006 | Jang |
| 2007/0012346 A1 | 1/2007 | Choi |
| 2009/0133191 A1 | 5/2009 | Harrow |
| 2009/0255564 A1 | 10/2009 | Xie |
| 2010/0176634 A1 | 7/2010 | Wahl |
| 2010/0299831 A1 | 12/2010 | Lee |
| 2011/0099712 A1 | 5/2011 | Jin |
| 2012/0107037 A1 | 5/2012 | Huang |
| 2012/0141195 A1 | 6/2012 | Lu |
| 2012/0222216 A1 | 9/2012 | Jin |
| 2013/0000528 A1 | 1/2013 | Jin |
| 2013/0067659 A1 | 3/2013 | Oh |
| 2013/0276228 A1 | 10/2013 | Hsieh |
| 2014/0030012 A1 | 1/2014 | Lee |
| 2014/0099155 A1 | 4/2014 | Chen |
| 2014/0130837 A1 | 5/2014 | Sy-Facunda |
| 2015/0130250 A1 | 5/2015 | Masunaga |
| 2015/0143630 A1 | 5/2015 | Harrow |
| 2015/0320225 A1 | 11/2015 | Boyd |
| 2015/0327684 A1 | 11/2015 | Lee |
| 2016/0157620 A1 | 6/2016 | Oh |
| 2016/0348395 A1 | 12/2016 | Jin |
| 2017/0122353 A1 | 5/2017 | Halliburton |
| 2018/0110339 A1 | 4/2018 | Moon |
| 2018/0192768 A1 | 7/2018 | Choi |
| 2018/0192778 A1 | 7/2018 | Choi |
| 2018/0271296 A1 | 9/2018 | Harrow |
| 2018/0332973 A1 | 11/2018 | Choi |
| 2019/0029435 A1 | 1/2019 | Choi |
| 2019/0045938 A1 | 2/2019 | Skaggs |
| 2019/0150608 A1 | 5/2019 | Johnson et al. |
| 2019/0200753 A1 | 7/2019 | Choi |
| 2019/0284831 A1 | 9/2019 | Volin |
| 2019/0292808 A1 | 9/2019 | Dotterweich |
| 2020/0337468 A1* | 10/2020 | Choi .............. F16B 7/105 |

FOREIGN PATENT DOCUMENTS

| | | |
|---|---|---|
| CN | 204336377 U | 5/2015 |
| CN | 209185860 U | 8/2019 |
| DE | 29515948 U1 | 1/1996 |
| EP | 1492432 B1 | 10/2016 |
| GB | 810195 A | 3/1959 |
| WO | WO 2013000149 A1 | 1/2013 |

* cited by examiner

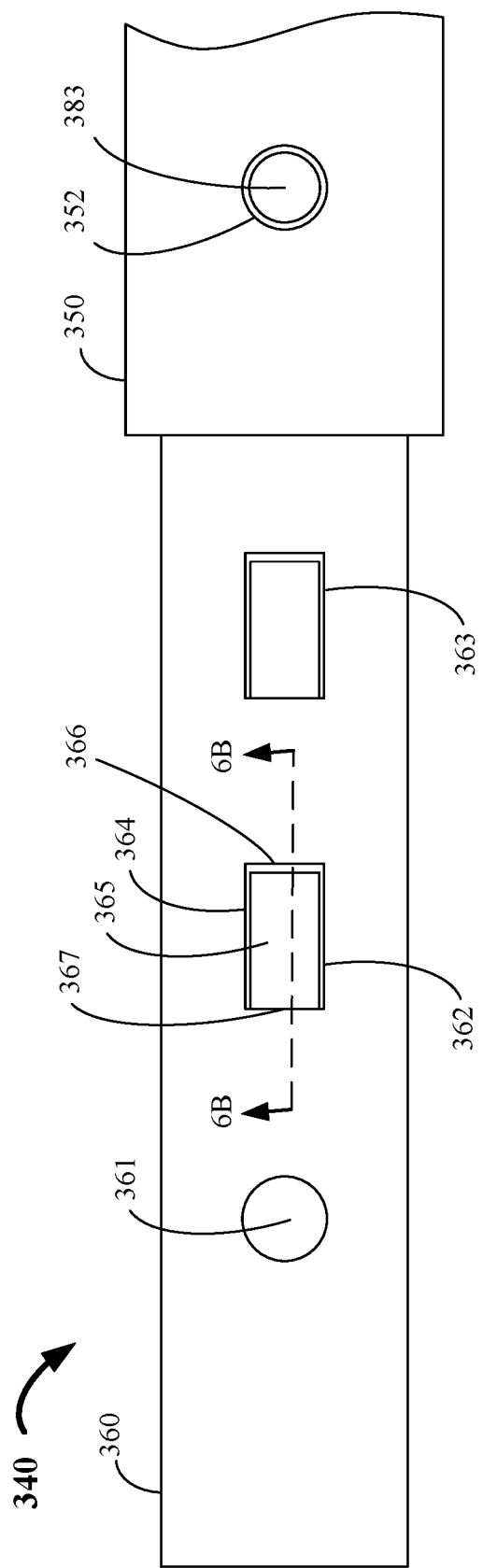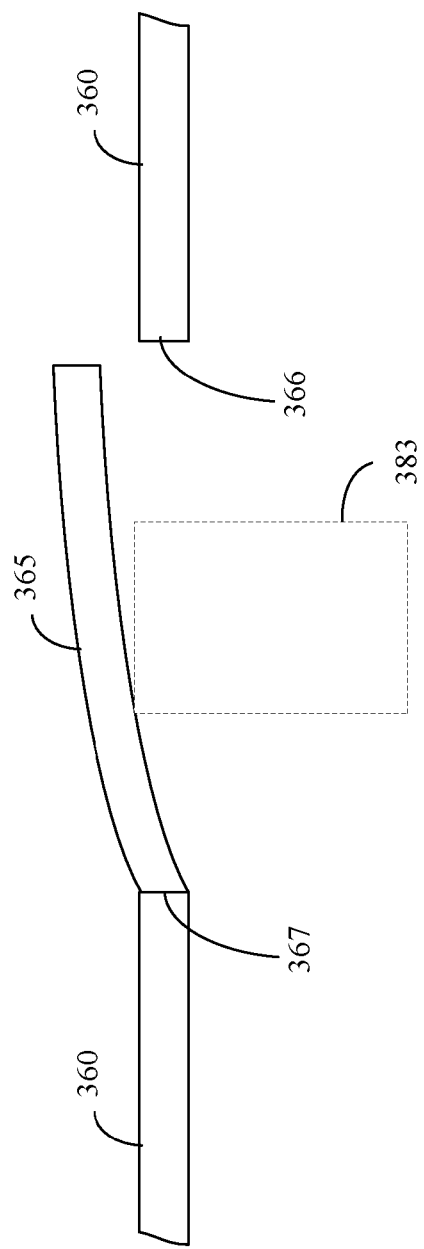

AUTO-LOCKING ADJUSTABLE BAR AND STRUCTURE HAVING SAME

CROSS-REFERENCE TO RELATED APPLICATIONS

The present application claims priority to Chinese Utility Model Applications CN 201921436899.6 filed Aug. 30, 2019 and CN 201921680777.1 filed Oct. 9, 2019. The disclosure of each application is incorporated herein for all purposes by reference in its entirety.

FIELD OF THE INVENTION

The present invention generally relates to adjustable bars and structures having adjustable bars, and in particular, relates to auto-locking adjustable bars and structures having such adjustable bars.

BACKGROUND

Most existing foldable tables are not adjustable in height, and do not fully meet the needs of different people. Some existing tables are adjustable through a control switch. For instance, CN209185890U discloses a foldable table with a control switch, the disclosure of which is incorporated herein for all purposes by reference in its entirety. However, the control switch is often not protected or locked. End users may press the switch by accident or children may play with the switch out of curiosity, causing unexpected folding or collapsing of the table. In some cases, this may lead to hands caught by the table or other safety issues.

Given the current state of the art, there remains a need for adjustable bars and structures such as leg assemblies, tables and beds that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present disclosure provides adjustable bars and structures incorporating such mechanisms such as height-adjustable leg assemblies, height-adjustable tables and foldable beds.

In various exemplary embodiments, the present disclosure provides an adjustable bar including an outer tubular bar, an inner bar and a locking/unlocking mechanism configured to control movement of the inner bar with respect to the outer tubular bar. The outer tubular bar includes a first restriction hole formed on a first wall of the outer tubular bar. The inner bar includes a proximal end, a distal end and a plurality of restriction members. The proximal end is disposed inside the outer tubular bar. The distal end is disposed outside of the outer tubular bar. The plurality of restriction members is formed at a first wall of the inner bar between the proximal end and distal end of the inner bar and spaced apart along a length direction of the inner bar. The locking/unlocking mechanism includes a base, a casing, a lever, a locking pin and a fixation pin. The base is fixedly coupled with the outer tubular bar. The casing is integrally formed or coupled with the base. The lever is pivotally connected with the casing. The locking pin is integrally formed or coupled with the lever, and selectively inserted into the first restriction hole of the outer tubular bar and any one respective restriction member in the plurality of restriction members of the inner bar, thereby selectively restricting movement of the inner bar with respect to the outer tubular bar. The fixation pin is configured to selectively restrict movement of the lever with respect the casing when the locking pin is inserted into the first restriction hole of the outer tubular bar and the respective restriction member of the inner bar, thereby preventing accidental release of the locking pin from the respective restriction member of the inner bar.

In some exemplary embodiments, the casing includes a first fixation hole at a first side of the casing, and the first fixation hole includes a main section and one or more side slots connected with the main section. The lever includes a first recess at a first side of the lever and one or more side slots connected with the first recess. The fixation pin is movably coupled with the first fixation hole of the casing, and includes one or more lugs configured to be selectively inserted into the one or more side slots of the first fixation hole of the casing and the one or more side slots of the first recess of the lever. When the one or more lugs of the fixation pin are inserted into the one or more side slots of the first fixation hole of the casing and the one or more side slots of the lever, the lever is restricted from moving with respect to the casing. When the one or more lugs of the fixation pin are removed from the one or more side slots of the lever, the first recess of the lever allows the lever to disengage from the fixation pin and to rotate with respect to the casing.

In some exemplary embodiments, the casing includes a second fixation hole at a second side of the casing. The fixation pin includes a first portion movably coupled with the first fixation hole of the casing and a second portion coupled with the second fixation hole. The first and second portions of the fixation pin are elastically coupled with each other to allow the one or more lugs of the fixation pin to pull out of the one or more side slots of the lever, thereby allowing the level to disengage from the fixation pin.

In an exemplary embodiment, the lever includes a second recess at a second side of the lever to receive at least a portion of the fixation pin cross-sectional-wise.

In some exemplary embodiments, the plurality of restriction members includes a second restriction hole formed at the first wall of the inner bar.

In some exemplary embodiments, the plurality of restriction members includes one or more one-way restriction structures. Each respective one-way restriction structure in the one or more one-way restriction structures includes a restriction slot and a restriction tongue. The restriction slot is formed at the first wall of the inner bar and includes a proximal edge toward the proximal end of the inner bar and a distal edge toward the distal end of the inner bar. The restriction tongue is integrally formed or connected with one of the proximal and distal edges of the restriction slot and curved inwardly with respect to the first wall of the inner bar along the length direction of the inner bar toward the other of the proximal and distal edges of the restriction slot.

In an exemplary embodiment, the restriction tongue is integrally formed or connected with the distal edge of the restriction slot and curved inwardly with respect to the first wall of the inner bar along the length direction of the inner bar toward the proximal edge of the restriction slot. As such, each one-way restriction structure in the one or more one-way restriction structures of the inner bar restricts the inner bar from moving away from the outer tubular bar along the length direction of the outer tubular bar but allows the inner bar to move toward the outer tubular bar along the length direction of the outer tubular bar.

In some exemplary embodiments, the locking pin includes a protruded step at a free end of the locking pin. The protruded step is configured to be inserted into a gap formed at the other of the proximal and distal edges of the restriction slot between the first wall of the inner bar and the restriction tongue, thereby preventing accidental release of the locking pin from each respective one-way restriction structure of the inner bar.

In an exemplary embodiment, the locking pin includes a groove adjacent the protruded step to receive the first wall of the inner bar at the other of the proximal and distal edges of the restriction slot.

In some exemplary embodiments, the base includes a base hole and a base pillar formed at a first side wall of the base. The base hole is aligned with the first restriction hole of the outer tubular bar. The casing is integrally formed or coupled with the first side wall of the base and surrounds the base hole and the base pillar. The lever includes a first end portion aligned with the base hole, a second end portion aligned with the base pillar, and a middle portion between the first and second portions and pivotally connected with the casing. The locking pin is integrally formed or coupled with the first end portion of the level, and has a free end toward the base hole.

In an exemplary embodiment, the locking/unlocking mechanism further includes an elastic member engaged with the base pillar. The elastic member has a first end abutting the first side wall of the base and a second end abutting the second portion of the lever. When a restriction member in the plurality of restriction members of the inner bar aligns with the first restriction hole of the outer tubular bar, the elastic member pushes the locking pin into the restriction member of the inner bar.

In various exemplary embodiments, the present disclosure provides an adjustable bar including an outer tubular bar, an inner bar and a locking/unlocking mechanism configured to control movement of the inner bar with respect to the outer tubular bar. The outer tubular bar includes a first restriction hole formed on a first wall of the outer tubular bar. The inner bar includes a proximal end disposed inside the outer tubular bar, a distal end disposed outside of the outer tubular bar, and a plurality of restriction members disposed between the proximal end and distal end of the inner bar and spaced apart along a length direction of the inner bar. The plurality of restriction members includes one or more one-way restriction structures. Each one-way restriction structure in the one or more one-way restriction structures includes a restriction slot and a restriction tongue. The restriction slot is formed at a first wall of the inner bar and includes a proximal edge toward the proximal end of the inner bar and a distal edge toward the distal end of the inner bar. The restriction tongue is integrally formed or connected with one of the proximal and distal edges of the restriction slot and curved inwardly with respect to the first wall of the inner bar along the length direction of the inner bar toward the other of the proximal and distal edges of the restriction slot. The locking/unlocking mechanism includes a locking pin to be selectively inserted into the first restriction hole of the outer tubular bar and the restriction slot of any one of the one or more one-way restriction structures of the inner bar, thereby selectively restricting the inner bar from moving along the length direction of the outer tubular bar in one direction but allowing the inner bar to move along the length direction of the outer tubular bar in another direction. The locking pin includes a protruded step at a free end of the locking pin. The protruded step is configured to be inserted into a gap formed at the other of the proximal and distal edges of the restriction slot between the first wall of the inner bar and the restriction tongue, thereby preventing accidental release of the locking pin from each respective one-way restriction structure of the inner bar.

In an exemplary embodiment, the locking pin further includes a groove adjacent the protruded step to receive the first wall of the inner bar at the other of the proximal and distal edges of the restriction slot.

In some exemplary embodiments, the locking/unlocking mechanism further includes a base, a casing, a lever and an elastic member. The base includes a base hole and a base pillar formed at a first side wall of the base. The base hole is aligned with the first restriction hole of the outer tubular bar. The casing is integrally formed or coupled with the first side wall of the base and surrounds the base hole and the base pillar. The lever includes a first end portion aligned with the base hole, a second end portion aligned with the base pillar, and a middle portion between the first and second portions and pivotally connected with the casing. The locking pin is integrally formed or coupled with the first end portion of the level, and has a free end toward the base hole. The elastic member is engaged with the base pillar, and has a first end abutting the first side wall of the base and a second end abutting the second portion of the lever. When the restriction slot of any one of the one or more one-way restriction structures of the inner bar aligns with the first restriction hole of the outer tubular bar, the elastic member pushes the locking pin into the restriction slot of the inner bar.

In various exemplary embodiments, the present disclosure provides a structure including a first support, a second support, and one or more adjustable bars disposed substantially perpendicular to a height direction of the structure. Each adjustable bar in the one or more adjustable bars has a first end connected with the first support and a second end connected with the second support such that changing a length of the adjustable bar changes a height of the structure. When the locking pin is inserted into the first restriction hole of the outer tubular bar and any one of the plurality of restriction members of the inner bar, reducing the height of the structure is restricted.

In some exemplary embodiments, the structure further includes a panel coupled with and supported by the first and second supports.

In various exemplary embodiments, the present disclosure provides a structure including a first assembly, a second assembly, and one or more adjustable bars. The second assembly is pivotally connected with the first assembly. Each adjustable bar in the one or more adjustable bars has a first end connected with the first assembly and a second end connected with the second assembly. When the locking pin is inserted into the first restriction hole of the outer tubular bar and any one of the plurality of restriction members of the inner bar, the first and second assemblies are restricted from moving with respect to each other in at least one direction.

The adjustable bars and structures (e.g., leg assemblies, tables and beds) of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

BRIEF DESCRIPTION OF THE DRAWINGS

The accompanying drawings, which are incorporated into and constitute a part of this specification, illustrate one or more exemplary embodiments of the present disclosure and, together with the Detailed Description, serve to explain the principles and implementations of exemplary embodiments of the invention.

FIG. 6A is a side view illustrating an exemplary adjustable bar in accordance with exemplary embodiments of the present disclosure.

FIG. 6B is a schematic cross-sectional view taken along line 6B-6B of FIG. 6A.

Figure 1:
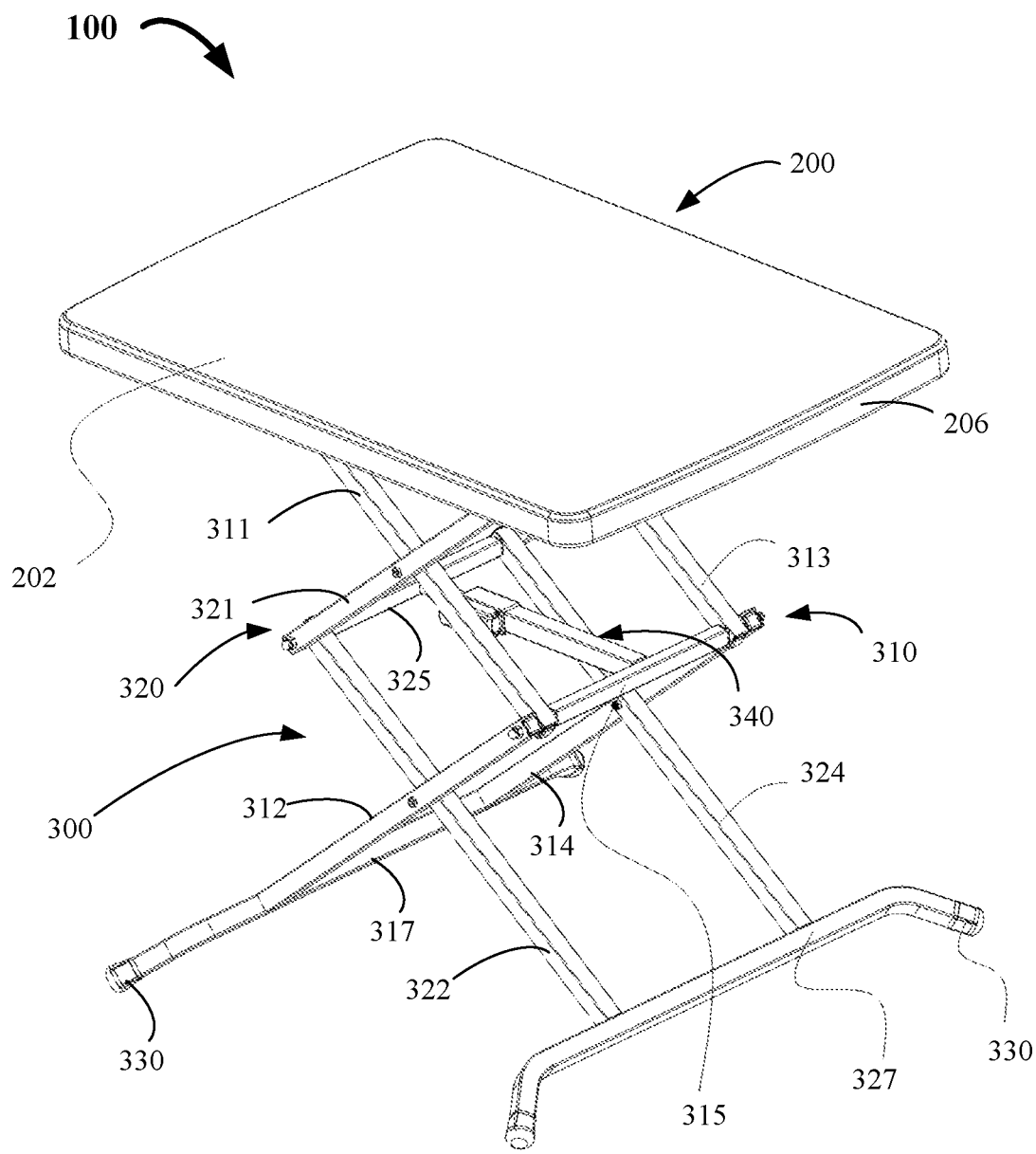
FIG. 1 is a top perspective view illustrating an exemplary table in accordance with exemplary embodiments of the present disclosure.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementation of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present disclosure are described in the context of adjustable bars. An adjustable bar of the present disclosure generally includes an inner bar, an outer bar and a locking/unlocking mechanism configured to control the movement of the inner and outer bars relative to each other. The locking/unlocking mechanism includes a locking pin to be selectively inserted into a restriction hole of the outer tubular bar and a restriction member of the inner bar, thereby selectively restricting relative movement of the inner and outer bars in at least one direction. For instance, in some exemplary embodiments, the inner bar is selectively allowed to move along the length direction of the outer bar in one direction but restricted from moving along the length direction of the outer bar in another direction. In some exemplary embodiments, the inner bar is selectively restricted from moving along the length direction of the outer bar in both directions. The locking/unlocking mechanism also includes a means to prevent accidental release of the locking pin from the restriction member, thereby enhancing the safety of the adjustable bar.

Embodiments of the present disclosure are also described in the context of structures having one or more adjustable bars. The structures of the present disclosure can be of various sizes and shapes, and can be made of various materials including but not limited to metals (e.g., iron, steel, and aluminum), plastics and woods. Examples of such structures include but are not limited to leg assemblies, tables and beds.

For instance, in some exemplary embodiments, a structure (e.g., a leg assembly) of the present disclosure includes a first support, a second support and an adjustable bar. The adjustable bar has a first end connected with the first support and a second support such that changing the length of the adjustable bar changes the height of the leg assembly. In various exemplary embodiments, the first and second supports collectively form one or more scissor lifts each having one or more pairs of crisscrossed bars. In such embodiments, variation of the length of the adjustable bar affects the expansion and contraction of the one or more scissor lifts, and thus changes the height of the leg assembly.

In some exemplary embodiments, a structure (e.g., a table) of the present disclosure includes a tabletop and a leg assembly to support the tabletop. It can be of various sizes. For instance, a table of the present disclosure can be a coffee table, a dining table, a picnic table or the like. The tabletop can be of various shapes including but not limited to a square shape, a round shape or a rectangular shape, and can be made of various materials including but not limited to plastics and woods. In some exemplary embodiments, the tabletop includes a table panel made of plastics by injection molding, blow molding or any other suitable processes.

In some exemplary embodiments, a structure (e.g., a bed) of the present disclosure includes a frame assembly and a leg assembly pivotally connected with the frame assembly. The structure also includes one or more adjustable bars each having a first end connected with the frame assembly and a second end connected with the leg assembly. In such embodiments, variation of the length of the adjustable bar(s) affects the rotation of the leg assembly with respect to the frame assembly, and thus selectively restricts movement of the leg assembly with respect to the frame assembly.

Figure 2:
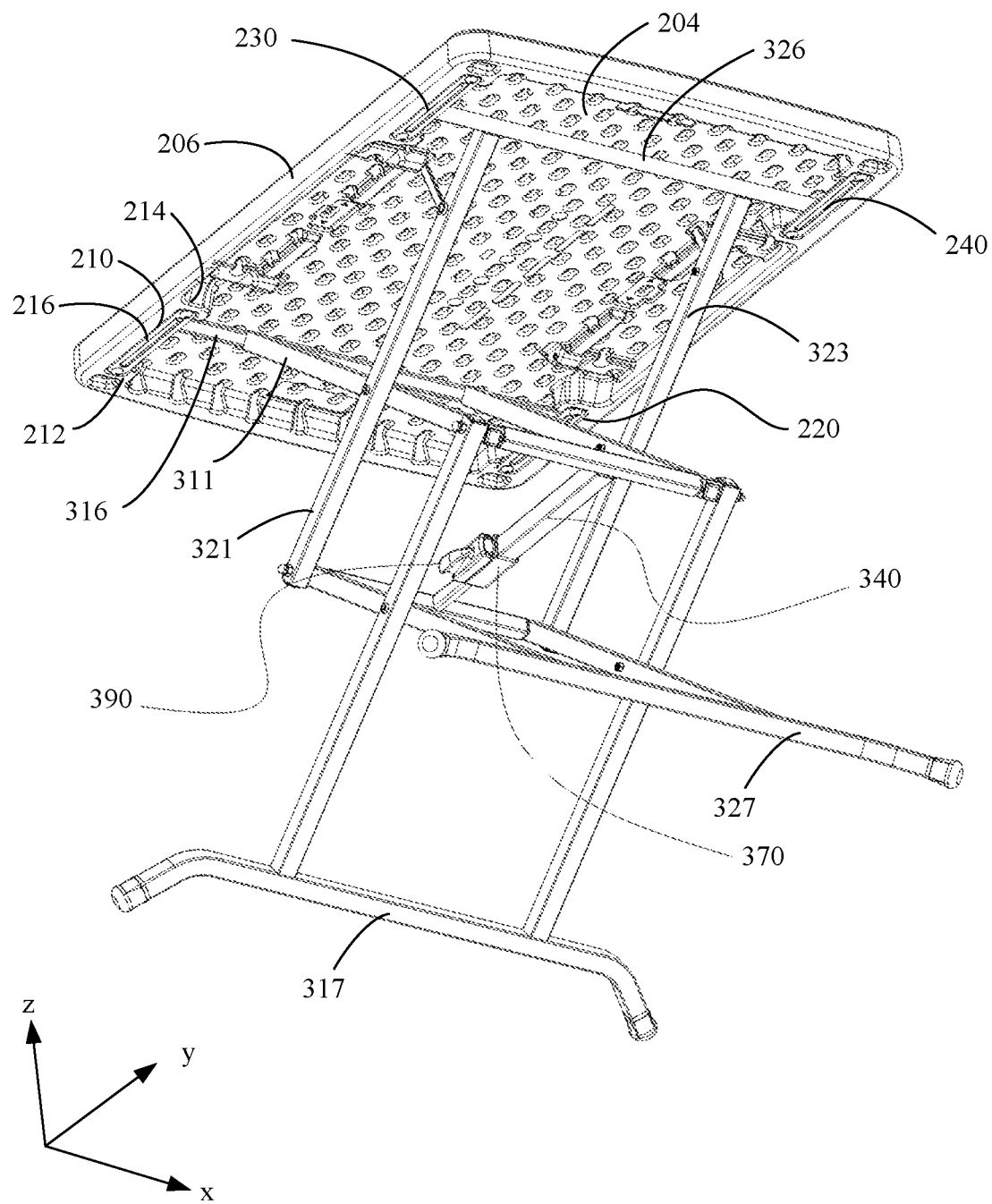
FIG. 2 is a bottom perspective view illustrating an exemplary frame in accordance with exemplary embodiments of the present disclosure.
Figure 3:
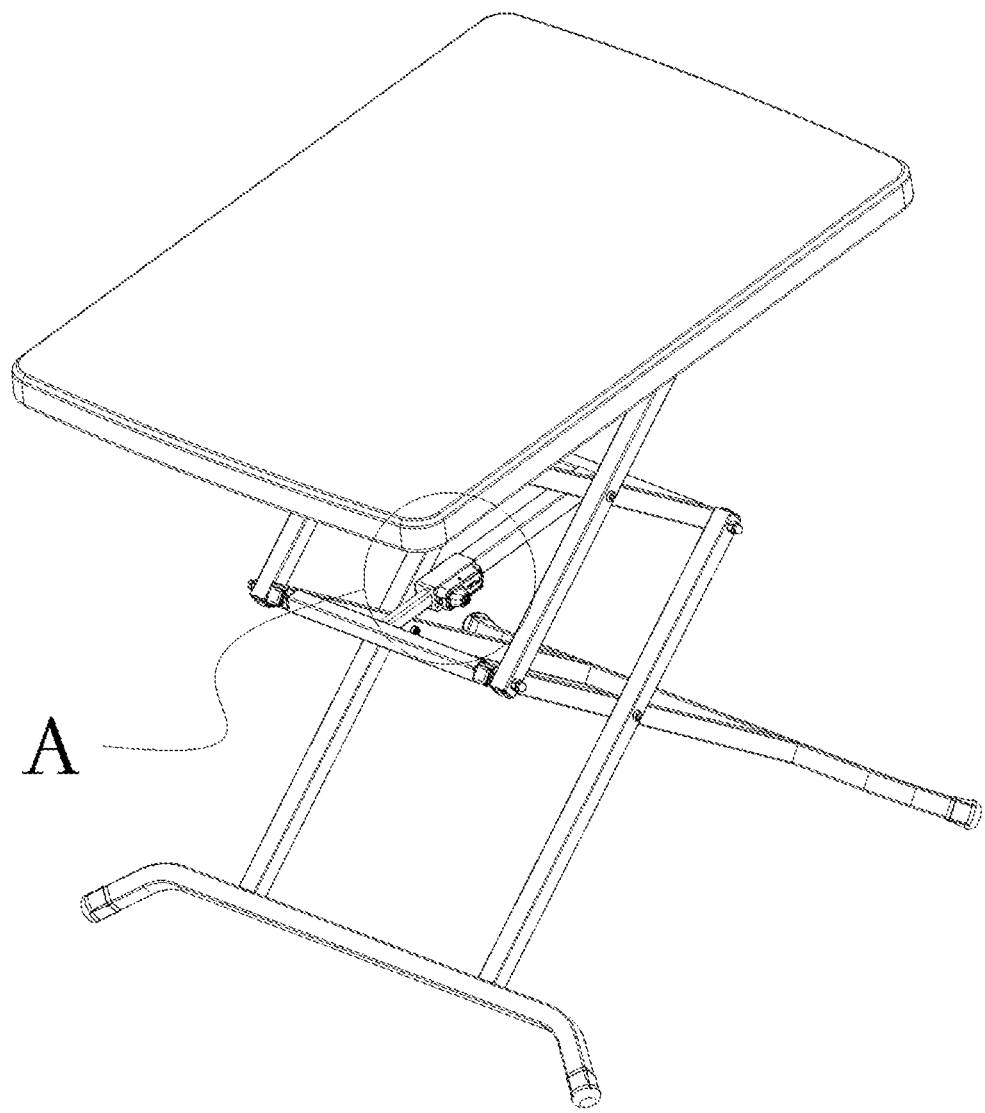
FIG. 3 is a top perspective view illustrating an exemplary table in accordance with exemplary embodiments of the present disclosure.
Figure 4:
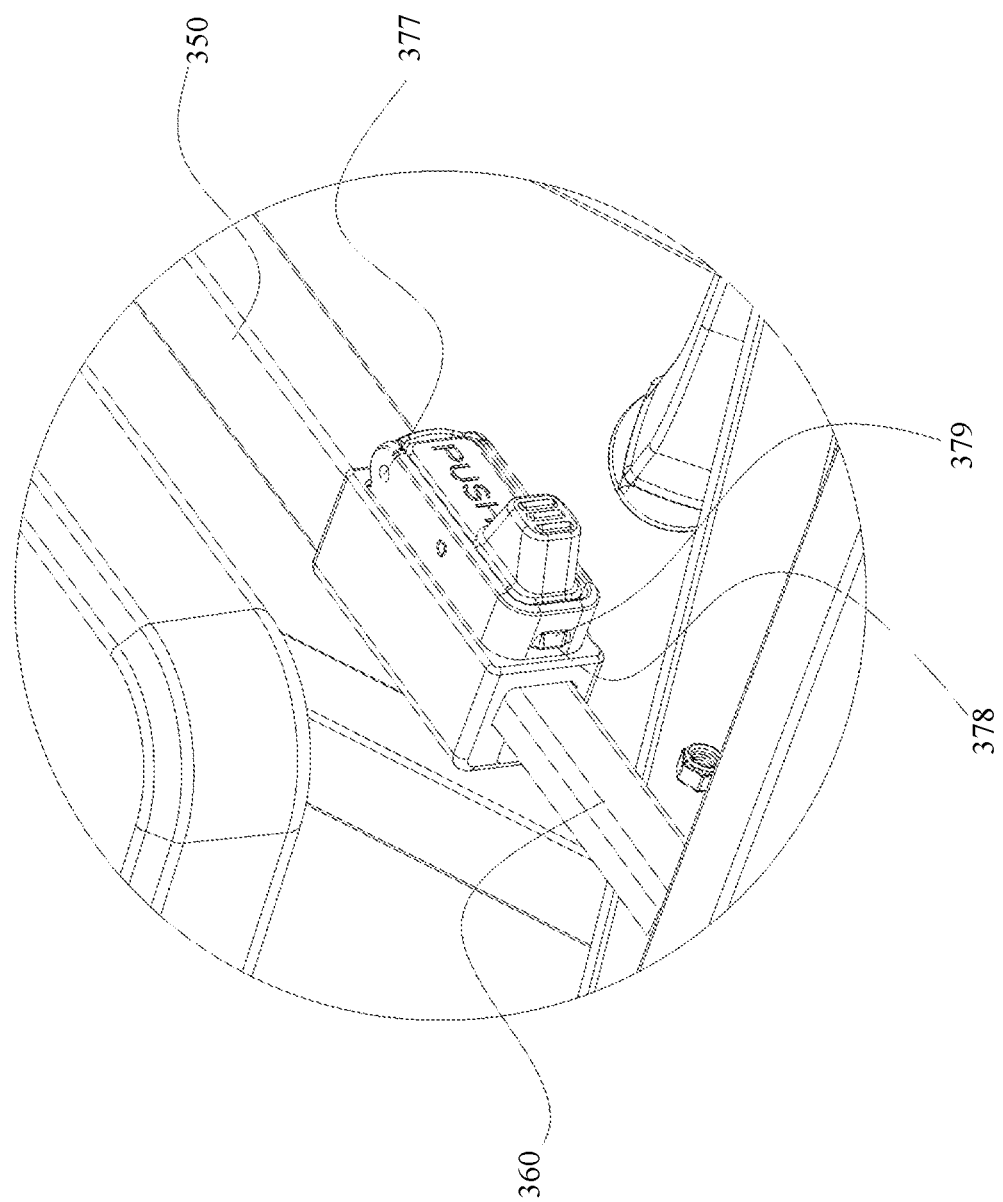
FIG. 4 is an enlarged view taken along circle A of FIG. 3.
Figure 5:
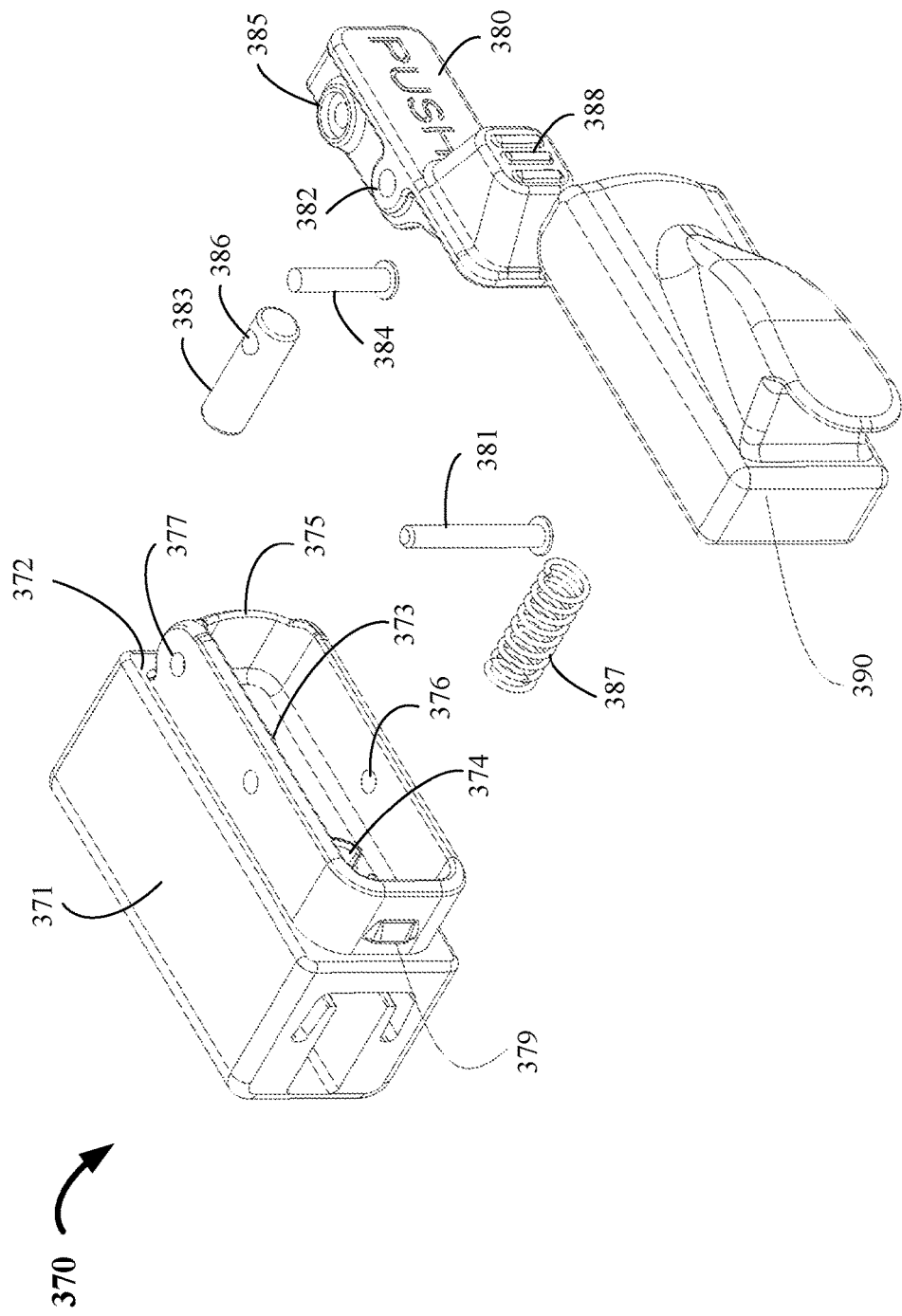
FIG. 5 is a disassembled view illustrating an exemplary locking/unlocking mechanism in accordance with exemplary embodiments of the present disclosure.

Referring now to FIGS. 1-3, there is depicted an exemplary table in accordance with some embodiments of the present disclosure. As shown, table 100 includes a tabletop such as tabletop 200 and a leg assembly such as leg assembly 300 coupled with the tabletop and supporting the tabletop when in use. While tabletop 200 is of a rectangular shape in the figures, it should be noted that tabletop 200 can be of any suitable shapes including but not limited to rectangular, square, round, oval, oblong or the like.

In various exemplary embodiments, tabletop 200 includes an upper surface such as upper surface 202, a lower surface such as lower surface 204, and an edge such as edge 206. In some exemplary embodiments, the edge is extended downward beyond the lower surface of the tabletop.

In some exemplary embodiments, tabletop 200 also includes a plurality of engagement slots for coupling with the leg assembly. For instance, by way of example, FIG. 2 illustrates first engagement slot 210, second engagement slot 220, third engagement slot 230 and fourth engagement slot 240. The first and second engagement slots are spaced apart in a first direction (e.g., x-direction in FIG. 2) of the tabletop with openings of the first and second engagement slots facing each other. The third and fourth engagement slots are spaced apart in the first direction of the tabletop with openings of the third and fourth engagement slots facing each other. It should be noted that the first and third engagement slots can be but are not necessarily aligned in a second direction (e.g., y-direction in FIG. 2), and similarly the second and fourth engagement slots can be but are not necessarily aligned in the second direction. By way of example, FIG. 2 illustrates the first and third engagement slots aligned in the second direction, and the second and fourth engagement slots aligned in the second direction.

In some exemplary embodiments, each of the first, second, third and fourth engagement slots is formed at least partially by a pair of protrusions and a holding piece. For instance, first engagement slot 210 is formed partially by a pair of protrusions such as first protrusion 212 and second protrusion 214 and a holding piece such as holding piece 216. The first and second protrusions are spaced apart in the second direction (e.g., y-direction in FIG. 2) of the tabletop. In some exemplary embodiments, the first and second protrusions are integrally formed or coupled with the lower surface of the tabletop. For instance, in an exemplary embodiment, the upper surface, the lower surface, the edge, and the plurality of pairs of protrusions are elements of a table panel formed by injection or blow molding of plastics. The first and second protrusions protrude downward from the lower surface of the tabletop, and the holding piece is fastened on first and second protrusions of the table panel. This creates a space between the holding piece and the lower surface of the tabletop and between the first and second protrusions.

While FIG. 2 illustrates the first and second protrusions at or adjacent to the edge of the tabletop, it should be noted that the first and second protrusions do not necessarily need to be disposed at or adjacent to the edge of the tabletop. For instance, in some exemplary embodiments, the first and second protrusions are spaced apart from an edge of the tabletop, or from any edge of the tabletop. It should also be noted that the first and second protrusions can be separate individual protrusions or joined protrusions connected by a connecting means, e.g., a rib, a flange, a protrusion, a recess, a channel, a depression, or the like.

The first and second protrusions of the second, third or fourth engagement slot can be configured similarly to the first engagement slot or differently from the first engagement slot. For instance, in an exemplary embodiment, the first and second protrusions of each of the second, third and fourth engagement slots are configured substantially the same as the first engagement slot, except they are disposed at different positions and/or in different orientations. In another exemplary embodiment, the first and/or second protrusions of at least one engagement slot is/are configured differently from those of the first engagement slot in terms of shape and/or size.

In various exemplary embodiments, leg assembly 300 includes a first support such as first support 310, a second support such as second support 320, and an adjustable bar such as adjustable bar 340. The first support movably connected with the tabletop at a first portion of the tabletop, and the second support movably connected with the tabletop at a second portion of the tabletop. The adjustable bar is connected with the first and second supports and configured to control the movement of the first support, the second support or both. This causes the change of the height of the leg assembly and thus the change of the height of the table.

In some exemplary embodiments, the first and second supports of the leg assembly collectively form one or more scissor lifts each including one or more pairs of crisscrossed bars. For instance, in an exemplary embodiment, the first and second supports of the leg assembly collectively form a scissor lift including a pair of crisscrossed bars, two pairs of crisscrossed bars, or more than two pairs of crisscrossed bars. In another exemplary embodiment, the first and second supports of the leg assembly collectively form a pair of scissor lifts, each scissor lift including a pair of crisscrossed bars, two pairs of crisscrossed bars, or more than two pairs of crisscrossed bars. In still another exemplary embodiment, the first and second supports of the leg assembly collectively form more than a single pair of scissor lifts.

By way of example, FIGS. 1-3 illustrate first support 310 and second support 320 collectively forming a pair of scissor lifts and each scissor lift including two pairs of crisscrossed bars. In some exemplary embodiments, first support 310 includes a first bar such as first bar 311, a second bar such as second bar 312, a third bar such as third bar 313, and a fourth bar such as fourth bar 314. The first and second bars of the first support are pivotally connected with each other at their proximal ends. The third and fourth bars of the first support are pivotally connected with each other at their proximal ends, and are spaced apart from the first and second bars of the first support. For instance, in an exemplary embodiment, first bar 311 and second bar 312 are disposed at or adjacent to one side of the table, and third bar 313 and fourth bar 314 are disposed at or adjacent to another side of the table. In some exemplary embodiments, first support 310 also includes a horizontal bar such as horizontal bar 315. The horizontal bar of the first support has a first end connected with the proximal end of the first or second bar of the first support, and a second end connected with the proximal end of the third or fourth bar of the first support.

Similarly, second support 320 includes a first bar such as first bar 321, a second bar such as second bar 322, a third bar such as third bar 323, and a fourth bar such as fourth bar 324. The first and second bars of the second support are pivotally connected with each other at their proximal ends. The third and fourth bars of the second support are pivotally connected with each other at their proximal ends, and are spaced apart from the first and second bars of the second support. For instance, in an exemplary embodiment, first bar 321 and second bar 322 are disposed at or adjacent one side of the table, and third bar 323 and fourth bar 324 are disposed at or adjacent another side of the table. In some exemplary embodiments, second support 320 also includes a horizontal bar such as horizontal bar 325. The horizontal bar of the second support has a first end connected with the proximal end of the first or second bar of the second support, and a second end connected with the proximal end of the third or fourth bar of the second support.

The first, second, third, and fourth bars of the first support are pivotally connected with the first, second, third, and fourth bars of the second support, respectively, at their middle portions. That is, the first bars of the first and second supports are pivotally connected with each other at their middle portions; the second bars of the first and second supports are pivotally connected with each other at their middle portions; the third bars of the first and second supports are pivotally connected with each other at their middle portions; and the fourth bars of the first and second supports are pivotally connected with each other at their middle portions. As such, the first and second supports collectively form a pair of scissor lifts, each scissor lift including two pairs of crisscrossed bars. It should be noted that the pivotal connection point at the middle portions can be but is not necessarily a central point of the bars.

In some exemplary embodiments, first support 310 also includes an upper crossbar such as upper crossbar 316, to which distal ends of the first and third bars of the first support are connected. The upper crossbar of the first support is movably connected with the tabletop. For instance, in an exemplary embodiment, the upper crossbar of the first support has a first end received in the first engagement slot (e.g., inserted into the space between the holding piece and the lower surface of the tabletop and between the first and second protrusions) and a second end received in the second engagement slot. The first and second engagement slots allow the upper crossbar of the first support to be slidable along the first and second engagement slots in the second direction (e.g., the y-direction in FIG. 2) of the tabletop and rotatable crosswise with respect to the first and second engagement slots.

Similarly, in some exemplary embodiments, second support 320 also includes an upper crossbar such as upper crossbar 326, to which distal ends of the first and third bars of the second support are connected. The upper crossbar of the second support is movably connected with the tabletop. For instance, in an exemplary embodiment, the upper crossbar of the second support has a first end received in the third engagement slot and a second end received in the fourth engagement slot. The third and fourth engagement slots allow the upper crossbar of the second support to be slidable along the third and fourth engagement slots in the second direction of the tabletop, and rotatable crosswise with respect to the first and second engagement slots.

In some exemplary embodiments, first support 310 further includes a lower crossbar such as lower crossbar 317, to which distal ends of the second and fourth bars of the first support are connected. In an exemplary embodiment, the lower crossbar of the first support includes first and second free ends bent downward, and an anti-slip base such as base 330 is coupled to each of the first and second free ends of the lower crossbar.

Similarly, in some exemplary embodiments, second support 320 further includes a lower crossbar such as lower crossbar 327, to which distal ends of the second and fourth bars of the second support are connected. In an exemplary embodiment, the lower crossbar of the second support includes first and second free ends bent downward, and an anti-slip base such as base 330 is coupled to each of the first and second free ends of the lower crossbar.

In various exemplary embodiments, adjustable bar 340 is disposed substantially perpendicular to a height direction (e.g., the z-direction in FIG. 2) of the leg assembly. The adjustable bar has a first end connected with the first support and a second end connected with the second support such that changing a length of the adjustable bar changes a height of the leg assembly. The first end of the adjustable bar can be connected to any suitable bar (e.g., the first, second, third, fourth or horizontal bar) of the first support, and the second end of the adjustable bar can be connected to any corresponding bar (e.g., the first, second, third, fourth or horizontal bar) of the second support. By way of example, FIGS. 1-3 illustrate the adjustable bar connected with the horizontal bars of the first and second supports.

Referring to FIGS. 2 and 4-6, in some exemplary embodiments, adjustable bar 340 includes an outer bar such as outer bar 350, an inner bar such as inner bar 360, and a locking/unlocking mechanism such as locking/unlocking mechanism 370 configured to control movement of the inner bar with respect to the outer tubular bar.

In some exemplary embodiments, the outer bar is a tubular bar. As used herein, the term "tubular bar" refers to an elongated bar that is hollow along a portion or an entire length of the bar. The cross section of a tubular bar can be of any suitable shape, e.g., regular or irregular, including, but not limited to, circular, polygonal and oval and oblong. In an exemplary embodiment, the inner bar is a solid flat piece. In another exemplary embodiment, the inner bar is a tubular bar. In some exemplary embodiments, the outer bar and the inner bar are movably coupled to each other, with at least a portion of the inner bar being inserted in the outer tubular bar. For instance, the inner bar includes a proximal end disposed inside the outer tubular bar, and a distal end disposed outside of the outer tubular bar.

In some exemplary embodiments, the outer tubular bar includes a first restriction hole such as first restriction hole 352. The first restriction hole is formed on a first wall of the outer tubular bar. In an exemplary embodiment, the first restriction hole of the outer tubular bar is formed at a position adjacent a proximal end of the outer tubular bar. The first restriction hole can be of various shapes including but not limited to circle, oval, square, diamond or the like.

The inner bar includes one or more restriction members formed at a first wall of the inner bar corresponding to the first restriction hole of the outer tubular bar. A restriction member can be a restriction hole, a one-way restriction structure having a restriction slot and a restriction tongue, or any other suitable restriction formations.

Figure 9A:
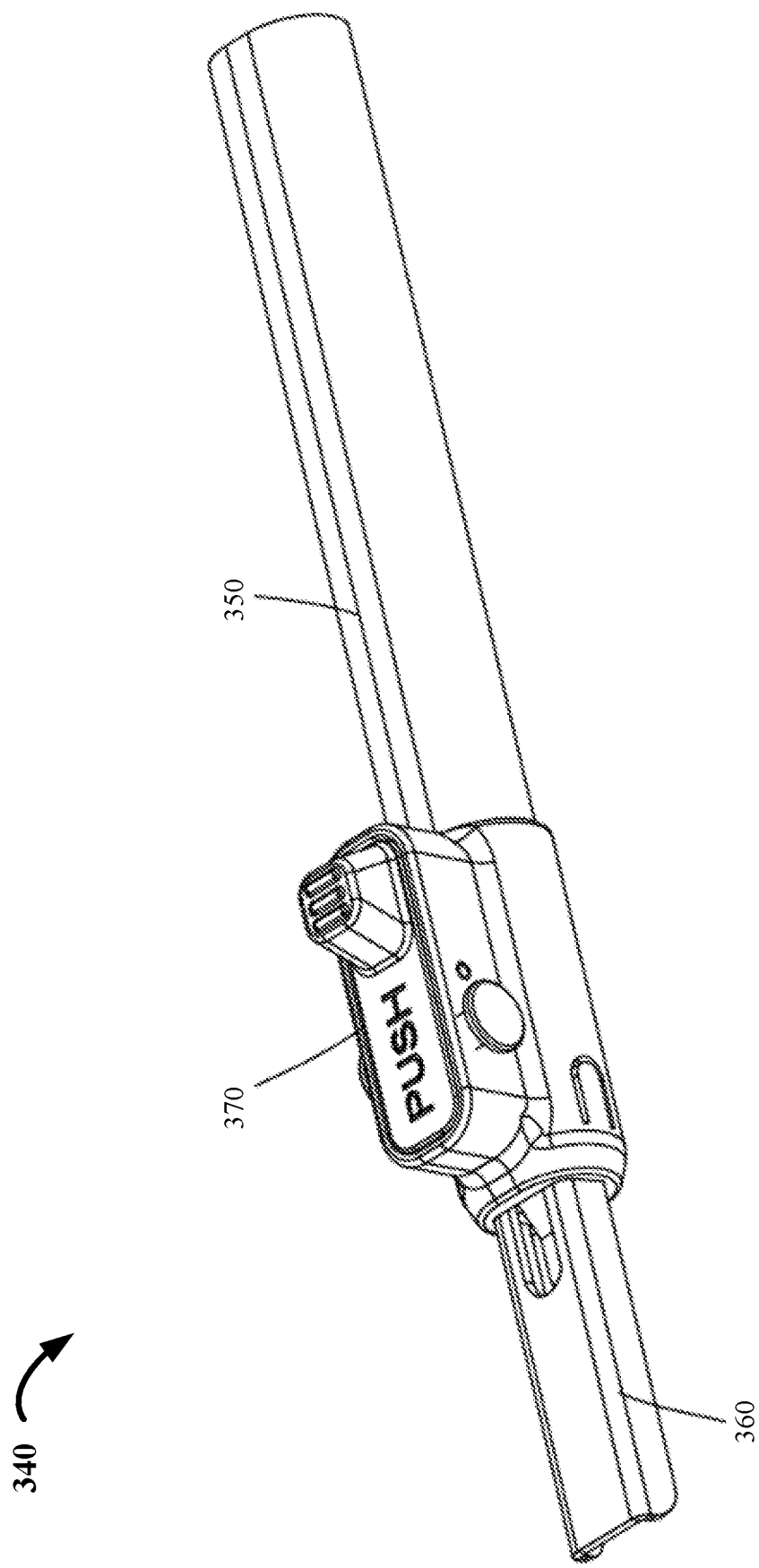
FIG. 9A is a perspective view illustrating an exemplary adjustable bar in accordance with exemplary embodiments of the present disclosure.
Figure 9B:
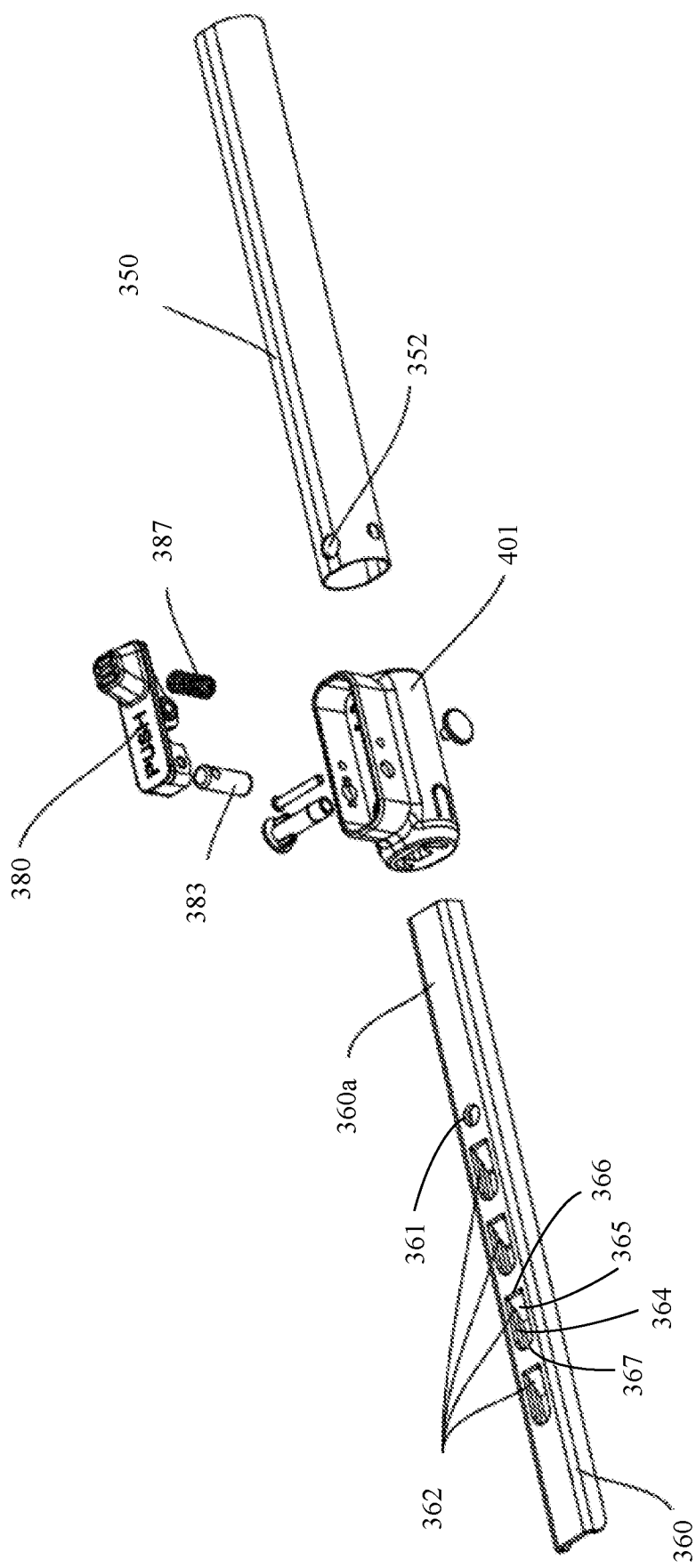
FIG. 9B is a disassembled view illustrating the exemplary adjustable bar of FIG. 9A.
Figure 9C:
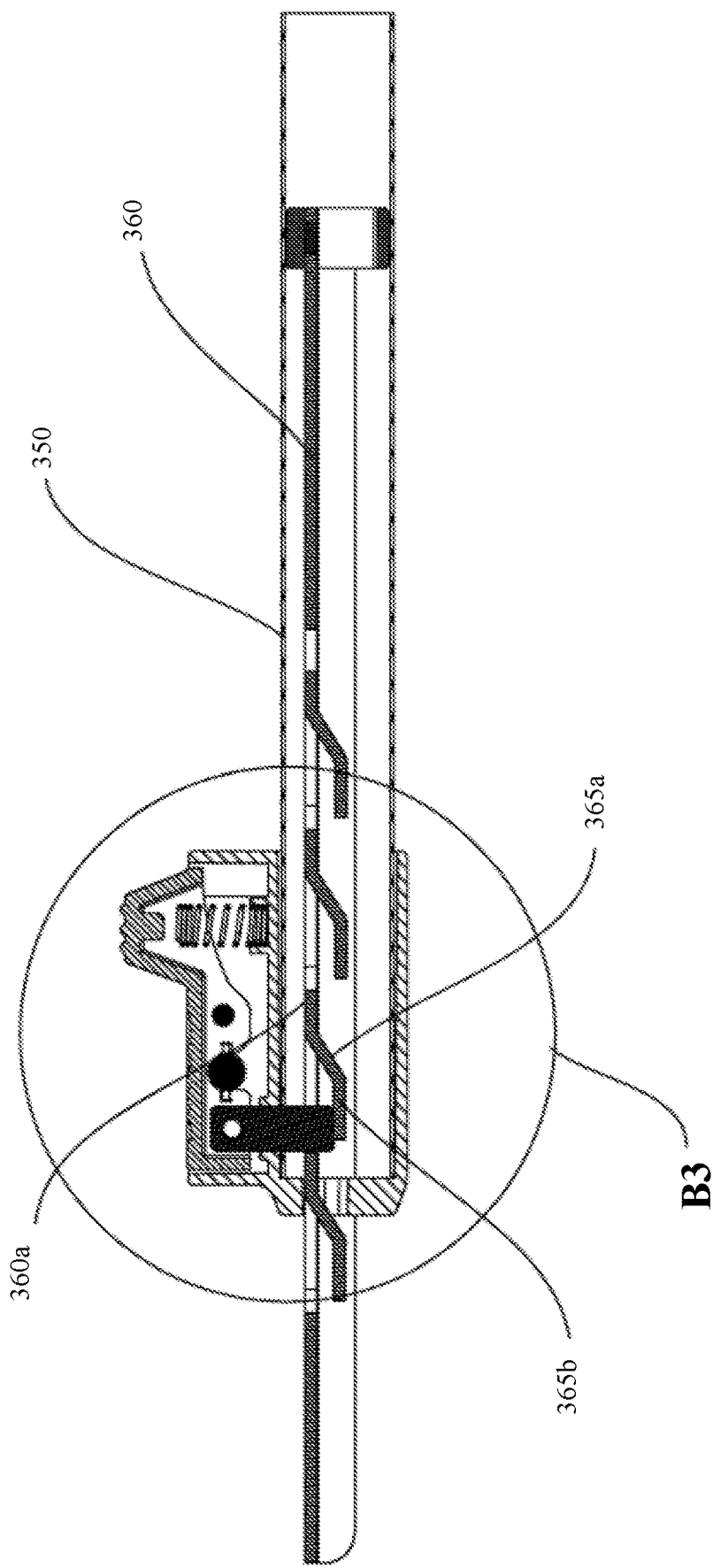
FIG. 9C is a first schematic cross-sectional view illustrating the exemplary adjustable bar of FIG. 9A in a locked state in accordance with exemplary embodiments of the present disclosure.
Figure 9D:
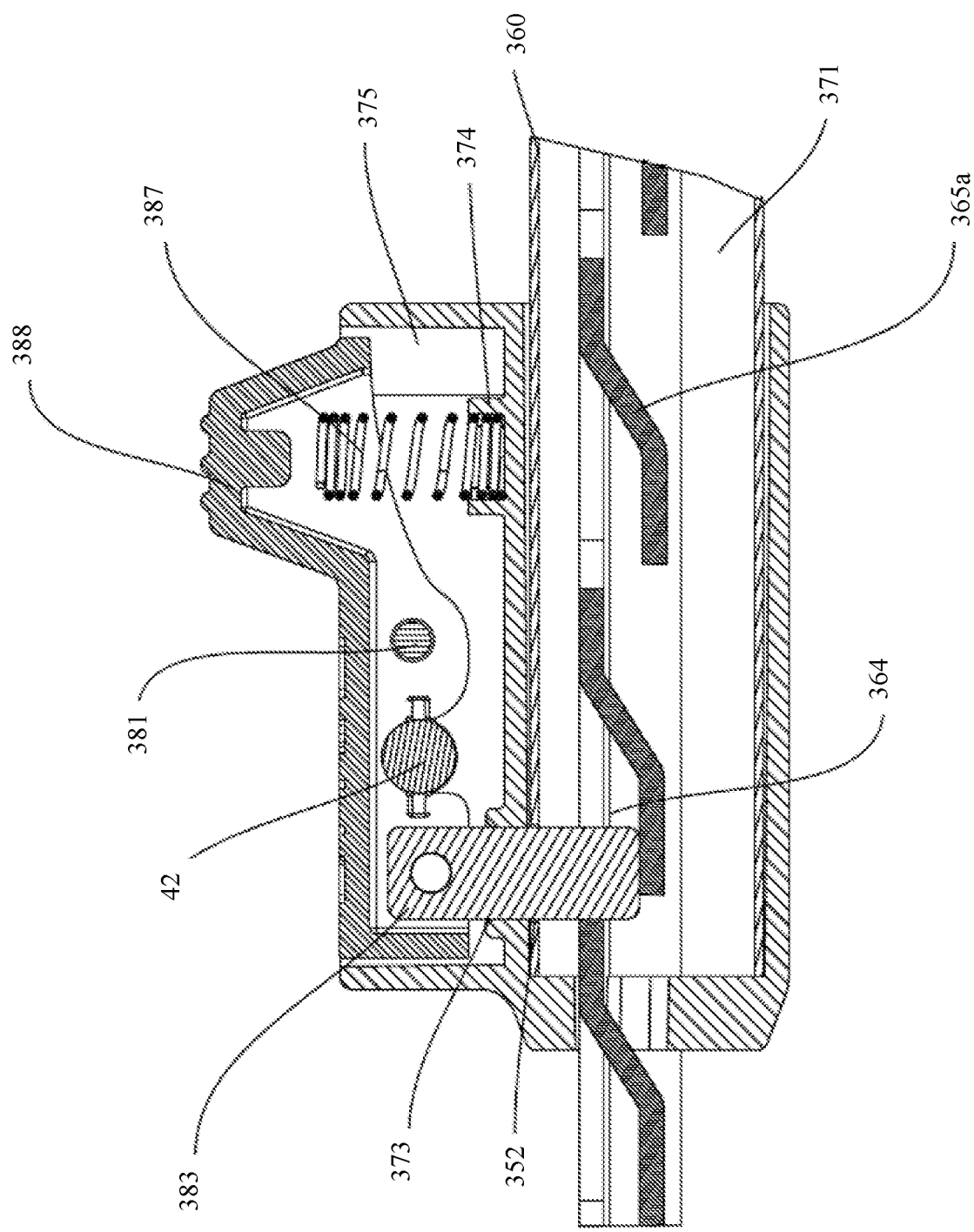
FIG. 9D is an enlarged view taken along circle B3 of FIG. 9C.
Figure 9E:
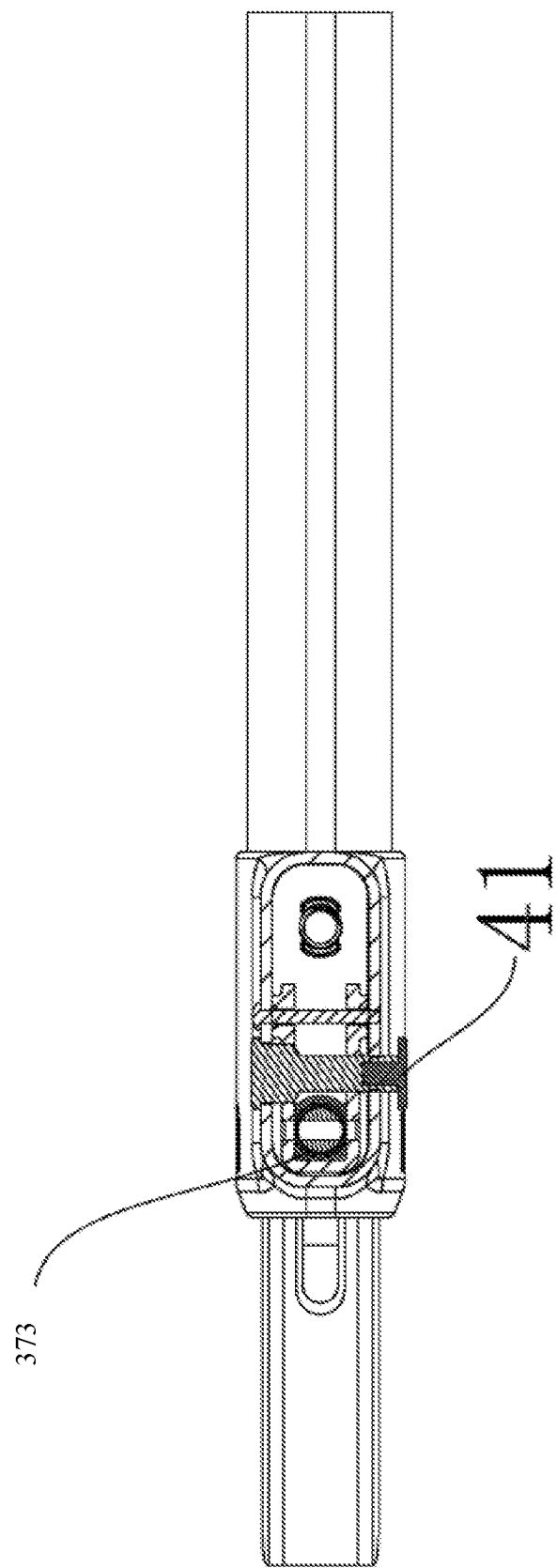
FIG. 9E is a second schematic cross-sectional view illustrating the exemplary adjustable bar of FIG. 9A in a locked state in accordance with exemplary embodiments of the present disclosure.

For instance, by way of example, FIG. 6A illustrates the inner bar including a second restriction hole such as second restriction hole 361, a first one-way restriction structure such as first one-way restriction structure 362 and a second one-way restriction structure 363 formed at the first wall of the inner bar. The first one-way restriction structure includes a restriction slot such as restriction slot 364 and a restriction tongue such as restriction tongue 365. Restriction slot 364 is formed at the first wall of the inner bar. Restriction slot 364 includes a proximal edge such as proximal edge 366 toward the proximal end of the inner bar and a distal edge such as distal edge 367 toward the distal end of the inner bar. Restriction tongue 365 is integrally formed or connected with one of the proximal and distal edges of the restriction slot and curved inwardly with respect to the first wall of the inner bar along the length direction of the inner bar toward the other of the proximal and distal edges of the restriction slot. By way of example, FIGS. 6A and 6B illustrate restriction tongue 365 integrally formed or connected with distal edge 367 and curved inwardly toward proximal edge 366. As another example, FIGS. 9A-9C illustrate restriction tongue 365 integrally formed or connected with proximal edge 366 and curved inwardly with respect to first wall 360a toward distal edge 367. The inwardly curved restriction tongue can take various forms, including but not limited to a smooth curve as illustrated in FIG. 6B, a stepwise curve including a step such as step 365b and a sloped portion such as sloped portion 365a connecting the step with the proximal or distal edge as illustrated in FIG. 9C. In an exemplary embodiment, the second one-way restriction structure is configured substantially the same as the first one-way restriction structure.

It should be noted that the inner bar can include any suitable number of restriction holes, any suitable number of one-way restriction structures, or any combination of restriction hole(s) and one-way restriction structure(s). For instance, in an exemplary embodiment, the inner bar includes one or more restriction holes, which can be of the same configuration (e.g., with the same shape and size) or different configurations. In another exemplary embodiment, the inner bar includes one or more one-way restriction structures, which can be of the same configuration or different configurations. In still another exemplary embodiment, the inner bar includes a combination of restriction hole(s) and one-way restriction structure(s).

Referring back to FIG. 5, in some exemplary embodiments, locking/unlocking mechanism 370 includes a base such as base 371 fixedly coupled with (e.g., snap-fitted, fastened, glued) the outer tubular bar, for instance, at or adjacent the proximal end of the outer tubular bar. Base 371 includes a first side wall such as first side wall 372, where a base hole such as base hole 373 and a base pillar such as base pillar 374 are formed at the first side wall of the base. The base hole is positioned in accordance with the first restriction hole of the outer tubular bar such that the first restriction hole of the outer tubular bar is accessible through the base hole. In some exemplary embodiments, the base hole and base pillar are formed at the first side wall of the base side by side along the length direction of the outer tubular bar.

In some exemplary embodiments, locking/unlocking mechanism 370 includes casing 375 integrally formed (e.g., by molding) or coupled (e.g., glued or fastened) with the first side wall of the base. Casing 375 can have any suitable shapes provided that it encloses or surrounds the base hole and base pillar formed at the first side wall of the base. In an exemplary embodiment, casing 375 is formed by a circumferential wall extended from the first side wall of the base, e.g., a portion of the first side wall of the base serves as the bottom of casing 375.

In some exemplary embodiments, locking/unlocking mechanism 370 includes a lever such as lever 380 pivotally connected with the casing. For instance, in some exemplary embodiments, lever 380 includes a first end portion aligned with the base hole of the base, a second end portion aligned with the base pillar of the base, and a middle portion between the first and second portions. In an exemplary embodiment, the middle portion of the lever is pivotally connected with the casing by a rod such as rod 381 passing through a hole such as hole 376 formed at the casing and a hole such as hole 382 formed at the middle portion of the lever.

In some exemplary embodiments, locking/unlocking mechanism 370 includes a pin such as locking pin 383 integrally formed or coupled with the first end portion of the level and having a free end toward the base hole formed at the first side wall of the base. For instance, in an exemplary embodiment, locking pin 383 is coupled with the first end portion of the lever by a rod such as rod 384 that passes a hole such as hole 385 formed at the first portion of the lever and a hole such as hole 386 formed at the locking pin.

In some exemplary embodiments, locking/unlocking mechanism 370 includes an elastic member such as elastic member 387 engaged with the base pillar formed at the first side wall of the base. Elastic member 387 has a first end abutting the bottom of the casing (e.g., the first side wall of the base) and a second end abutting the second portion of the lever. Thus, when any restriction member (e.g., restriction hole or one-way restriction structure) of the inner bar aligns with the first restriction hole of the outer tubular bar, elastic member 387 pushes the free end of locking pin 383 into the restriction member of the inner bar. Depending on the configuration of the restriction member of the inner bar, the inner bar is restricted from moving along the length direction of the outer tubular bar in both directions, or is restricted from moving along the length direction of the outer tubular bar in one direction but allowed to move along the length direction of the outer tubular bar in another direction.

For instance, referring in particular to FIGS. 6A and 6B, when second restriction hole 361 of the inner bar aligns with first restriction hole 352 of the outer tubular bar, elastic member 387 pushes the free end of locking pin 383 into second restriction hole 361 of the inner bar. As such, the inner bar is restricted from moving along the length direction of the outer tubular bar in both directions (e.g., left and right directions in FIG. 6A). When first one-way restriction structure 362 of the inner bar aligns with first restriction hole 382 of the outer tubular bar, elastic member 387 pushes the free end of locking pin 383 into restriction slot 364 of first one-way restriction structure 362 of the inner bar. Since restriction tongue 365 is integrally formed or connected with distal edge 367, it pushes the locking pin out of the restriction slot when the locking pin is adjacent the distal edge of the restriction slot, thereby allowing the inner bar to move toward the outer tubular bar. Since restriction tongue 365 is curved inwardly toward proximal edge 366, the free end of the locking pin remains in the restriction slot adjacent the proximal edge of the restriction slot, thereby restricting the inner bar from moving away from the outer tubular bar.

Pressing the second portion of the lever toward the base will pull the free end of locking pin 383 out of the restriction member of the inner bar or out of both the restriction member of the inner bar and the first restriction hole of the outer tubular bar. This disengages the inner bar from the outer tubular bar, and thus allows the inner bar to move in both directions along the length direction of the outer tubular bar. In some exemplary embodiments, the second portion of the lever includes a protrusion such as protrusion 388 that is protruded outside of the casing to facilitate easy pressing of the second portion of the lever.

In some exemplary embodiments, locking/unlocking mechanism 370 includes a cover such as cover 390 to prevent accidental press of the second portion of the lever toward the base or accidental release of the locking pin from the restriction member (e.g., second restriction hole or restriction slot of a one-way restriction structure) of the inner bar. In some exemplary embodiments, the cover has a first portion pivotally coupled with the casing and a second portion snap-fitted with the casing. For instance, in some exemplary embodiments, the casing includes a hole such as hole 377 formed at a first side wall of the casing for pivotally coupling the first portion of the cover and a protrusion such as protrusion 378 at a second side wall of the casing for snap-fitting the second portion of the cover. In an exemplary embodiment, protrusion 378 includes a sloped surface such as sloped surface 379 to help engage the second portion of the cover with the casing.

Referring to FIGS. 7A-7K, in some exemplary embodiments, adjustable bar 340 includes an outer bar such as outer bar 350, an inner bar such as inner bar 360, and a locking/unlocking mechanism such as locking/unlocking mechanism 370 configured to control movement of the inner bar with respect to the outer tubular bar. The outer bar includes bar includes a first restriction hole such as first restriction hole 352. The inner bar includes one or more restriction members. A restriction member can be a restriction hole such as second restriction holes 361 or a one-way restriction structure such as one-way restriction structure 362 or one-way restriction structure 363 or the like.

In some exemplary embodiments, locking/unlocking mechanism 370 includes a base such as base 371 fixedly coupled with the outer tubular bar. Base 371 includes base hole 373 and base pillar 374 formed at first side wall 372 of the base. Locking/unlocking mechanism 410 also includes a casing such as casing 375 for housing locking pin 383 and/or elastic member 387. In an exemplary embodiment, base 317 and casing 375 are integrally formed as one-piece component denoted by reference numeral 401. Locking/unlocking mechanism 410 further includes a lever such as lever 380 pivotally connected with the casing, for instance, by rod 381 passing through hole 376 formed at the casing and hole 382 formed at the middle portion of the lever.

Figure 7A:
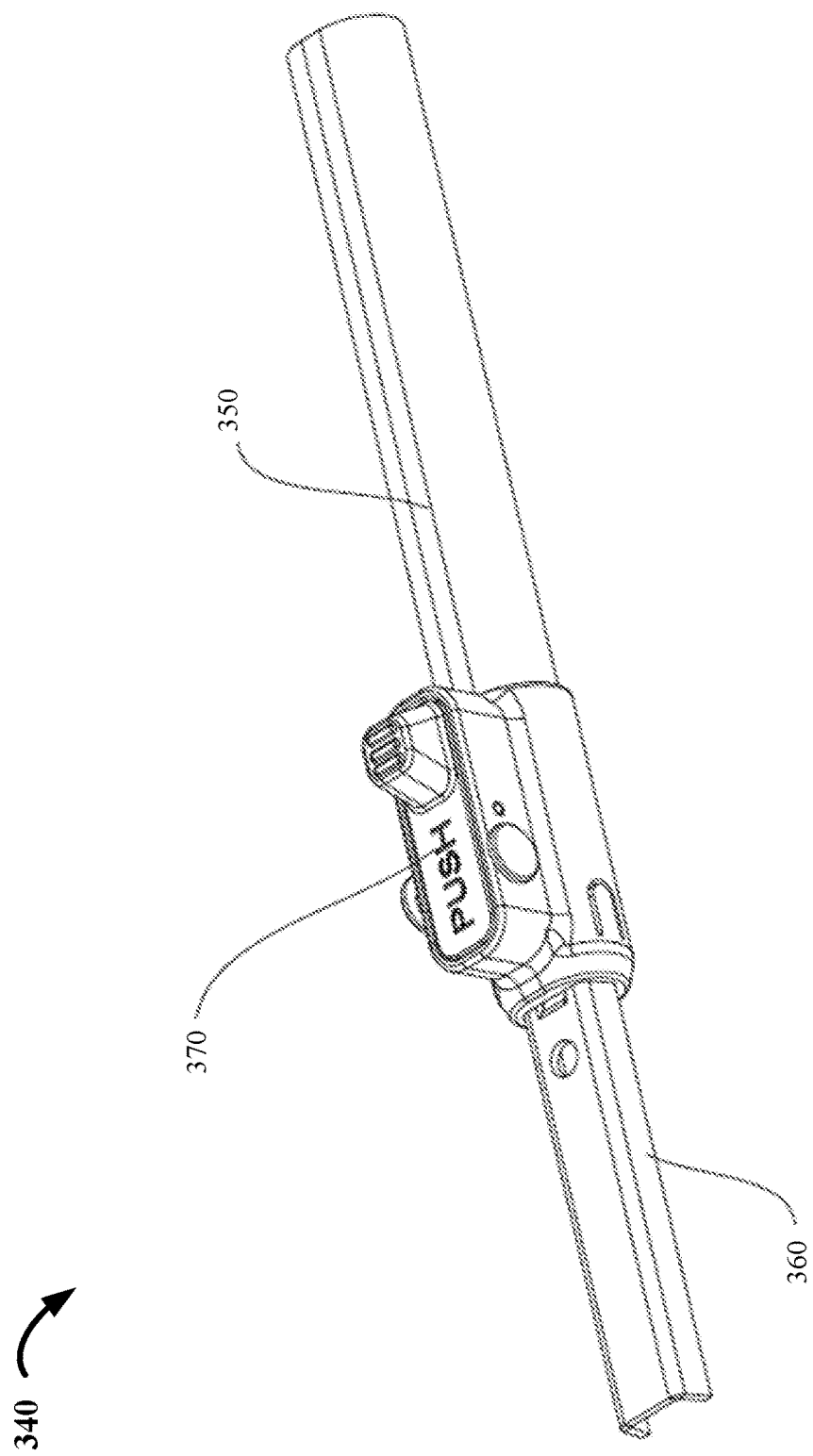
FIG. 7A is a perspective view illustrating an exemplary adjustable bar in accordance with exemplary embodiments of the present disclosure.
Figure 7B:
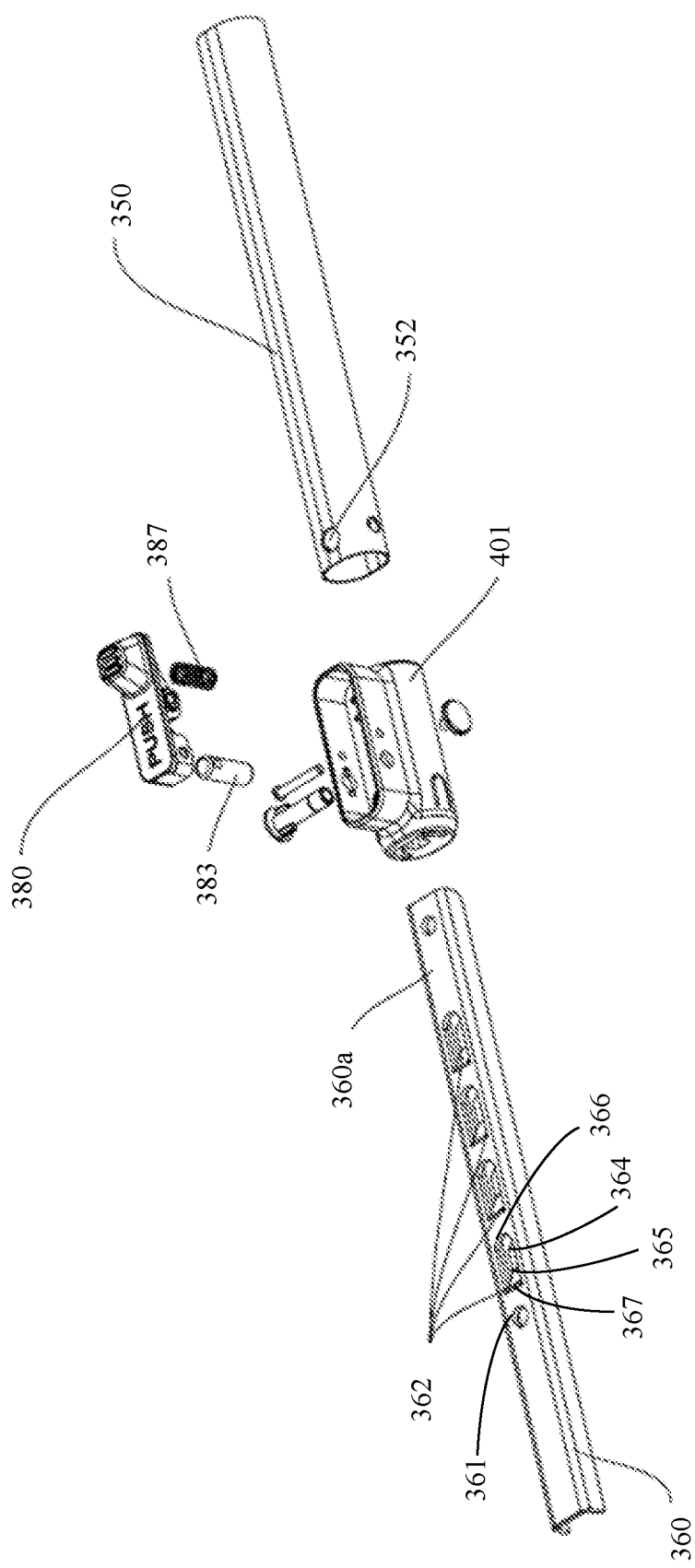
FIG. 7B is a disassembled view illustrating the exemplary adjustable bar of FIG. 7A.
Figure 7C:
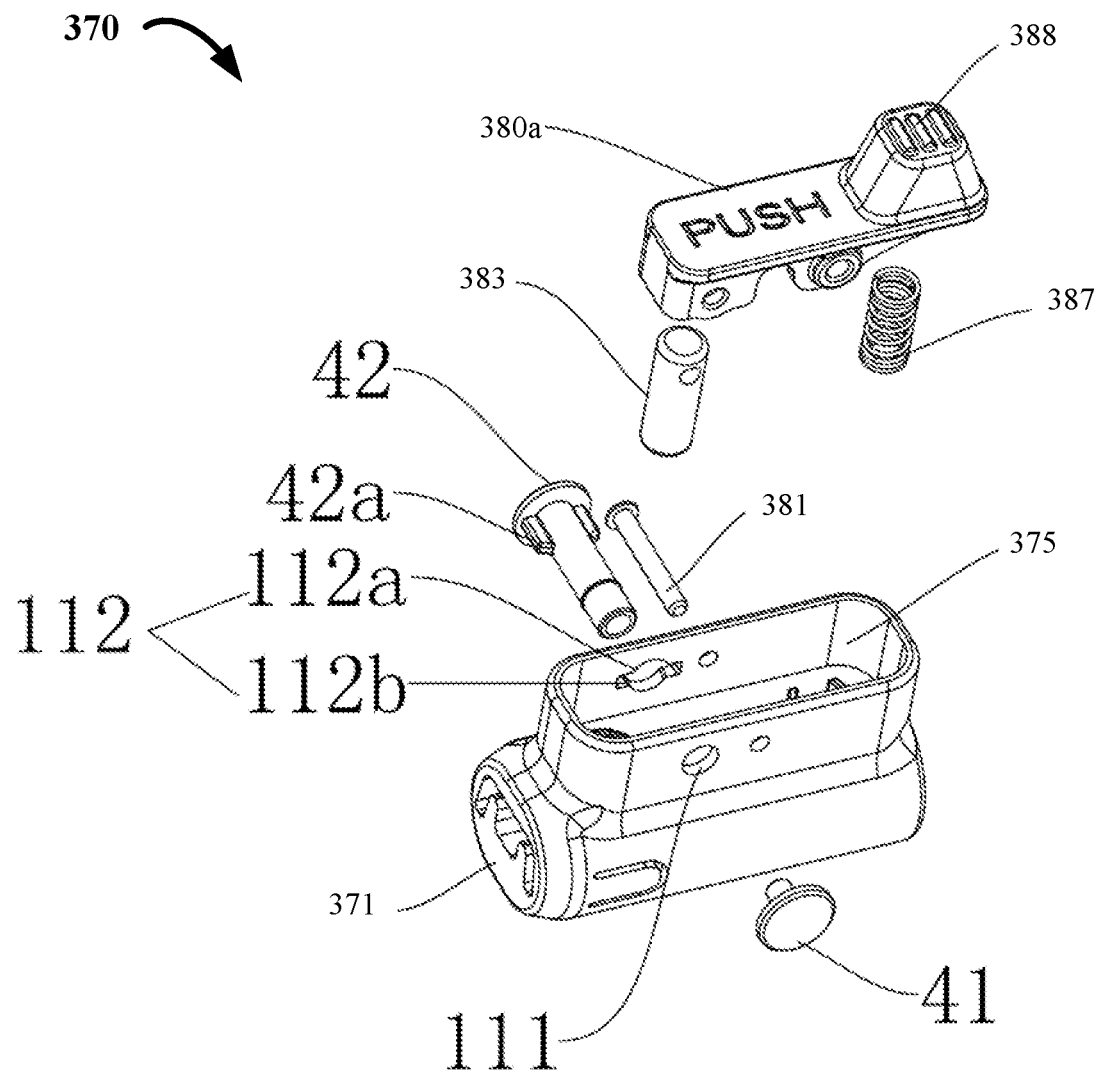
FIG. 7C is disassembled view illustrating an exemplary locking/unlocking mechanism in accordance with exemplary embodiments of the present disclosure.

In some exemplary embodiments, locking/unlocking mechanism 370 further includes a means to prevent accidental release of the locking pin from the restriction member, thereby enhancing the safety of the adjustable bar. For instance, referring in particular to FIGS. 7C-7E, locking/unlocking mechanism 370 includes a fixation pin to selectively restrict movement of the lever with respect the casing when the locking pin is inserted into the first restriction hole of the outer tubular bar and the respective restriction member of the inner bar. The fixation pin can be of one piece or composed of multiple pieces. By way of example, FIG. 7C illustrates an exemplary fixation pin including first portion 42 and second portion 41. In some exemplary embodiments, the first and second portions of the fixation pin are elastically coupled with each other and collectively form a pull rod or a tension rod. In an exemplary embodiment, first portion 42 of the fixation pin includes one or more lugs. For instance, FIG. 7C illustrates two lugs 42a, one on each side of the first portion of the fixation pin.

In some exemplary embodiments, to couple the fixation pin, casing 375 includes a first fixation hole such as first fixation hole 112 formed at the first side of the casing. First fixation hole includes a main section such as main section 112a and one or more side slots connected with the main section and corresponding to the one or more lugs of the fixation pin. By way of example, FIG. 7C illustrates first fixation hole 112 having two side slots 112b, one on each side of main section 112a. In an exemplary embodiment, the casing includes a second fixation hole such as second fixation hole 111 at the second side of the casing. The second fixation hole of the casing is configured to couple with second portion 41 of the fixation pin. In an exemplary embodiment, the first and second fixation holes of the casing are formed at positions so that the fixation pin is disposed between rod 381 and locking pin 383 along the length direction of the adjustable bar as illustrated in FIG. 7G.

Figure 7D:
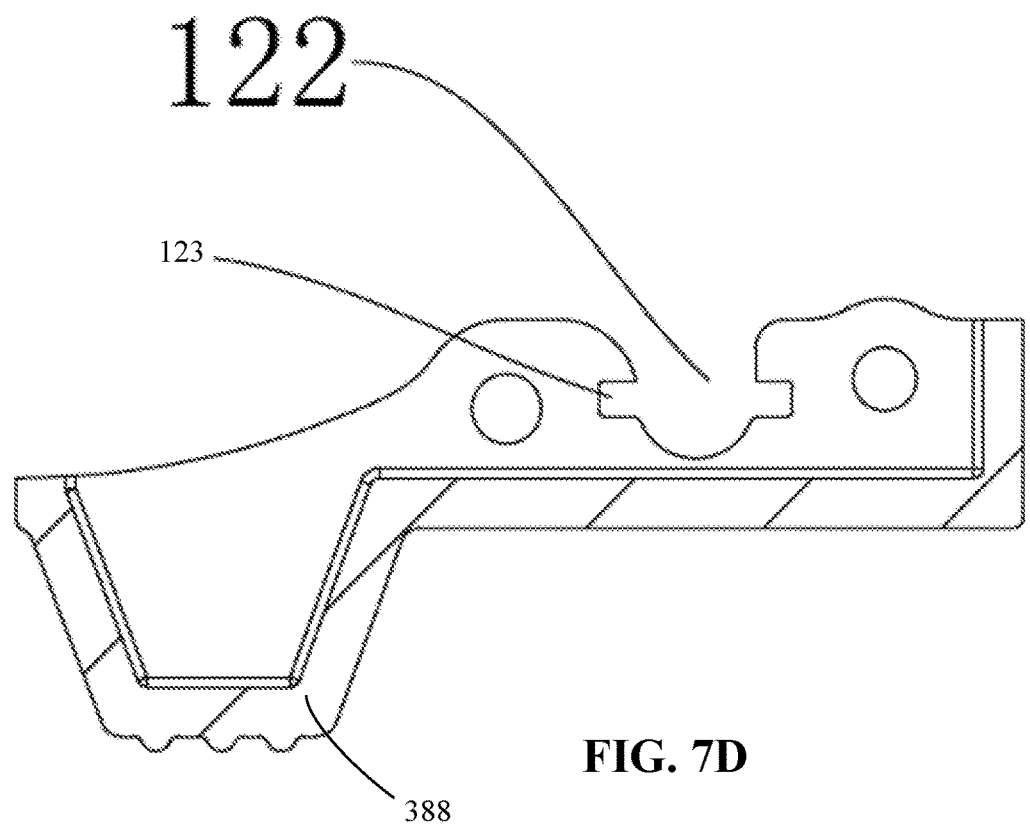
FIG. 7D and FIG. 7E are schematic cross-sectional views illustrating a component of the exemplary locking/unlocking mechanism of FIG. 7C in accordance with exemplary embodiments of the present disclosure.
Figure 7E:
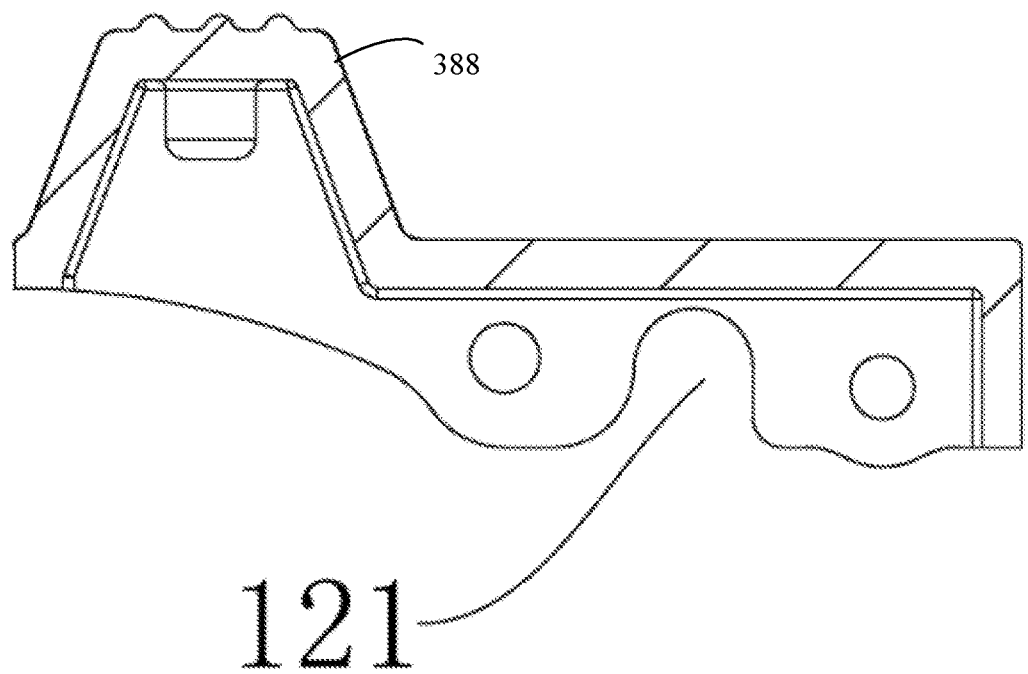

In some exemplary embodiments, to accommodate the fixation pin, lever 380 includes a first recess such as first recess 122 at the first side of the lever and one or more side slots connected with the first recess. For instance, in an exemplary embodiment, the lever has two side slots 123 as illustrated in FIG. 7D, which correspond to the two side slots formed at the casing. In an exemplary embodiment, the lever includes a second recess such as second recess 121 at the second side of the lever. The first and second recesses of the lever are configured to receive at least a portion of the fixation pin (cross-sectional-wise), and to allow the lever to disengage from the fixation pin when desired.

In some exemplary embodiments, the fixation pin (e.g., first portion 42 of the fixation pin) is movably coupled with the first fixation hole of the casing, e.g., the first portion 42 of the fixation pin movable with respect to the casing toward or away from the second side of the casing. As such, lug 42a of the first portion of the fixation pin can be selectively inserted into or pulled out of side slot 112b of the first fixation hole of the casing and/or side slot 123 of the first recess of the lever. When lug 42a of the first portion of the fixation pin is inserted into side slot 112b of the first fixation hole of the casing and side slot 123 of the first recess of the lever, the lever is restricted from moving with respect to the casing. This prevents accidental release of the locking pin from the restriction member of the inner bar, and thus enhances the safety of adjustable bars and structures using such adjustable bars. When lug 42a of the first portion of the fixation pin is removed from side slot 123 of the first recess of the lever, the first recess of the lever allows the lever to disengage from the fixation pin and thus allows the lever to rotate with respect to the casing. The rotation of the lever pulls the locking pin out of the restriction member of the inner bar, and thus allows the inner and outer bars to move with respect to each other.

Figure 7F:
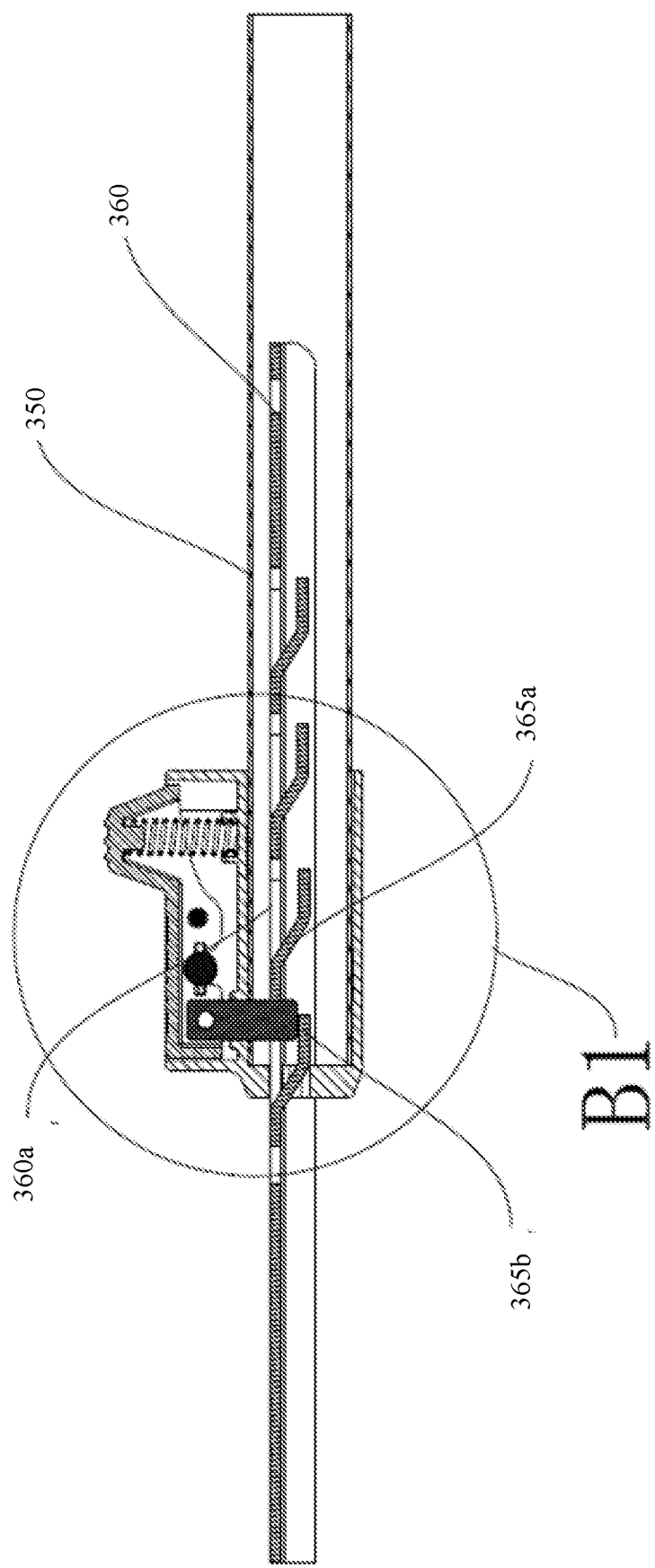
FIG. 7F is a first schematic cross-sectional view illustrating the exemplary adjustable bar of FIG. 7A in a locked state in accordance with exemplary embodiments of the present disclosure.
Figure 7G:
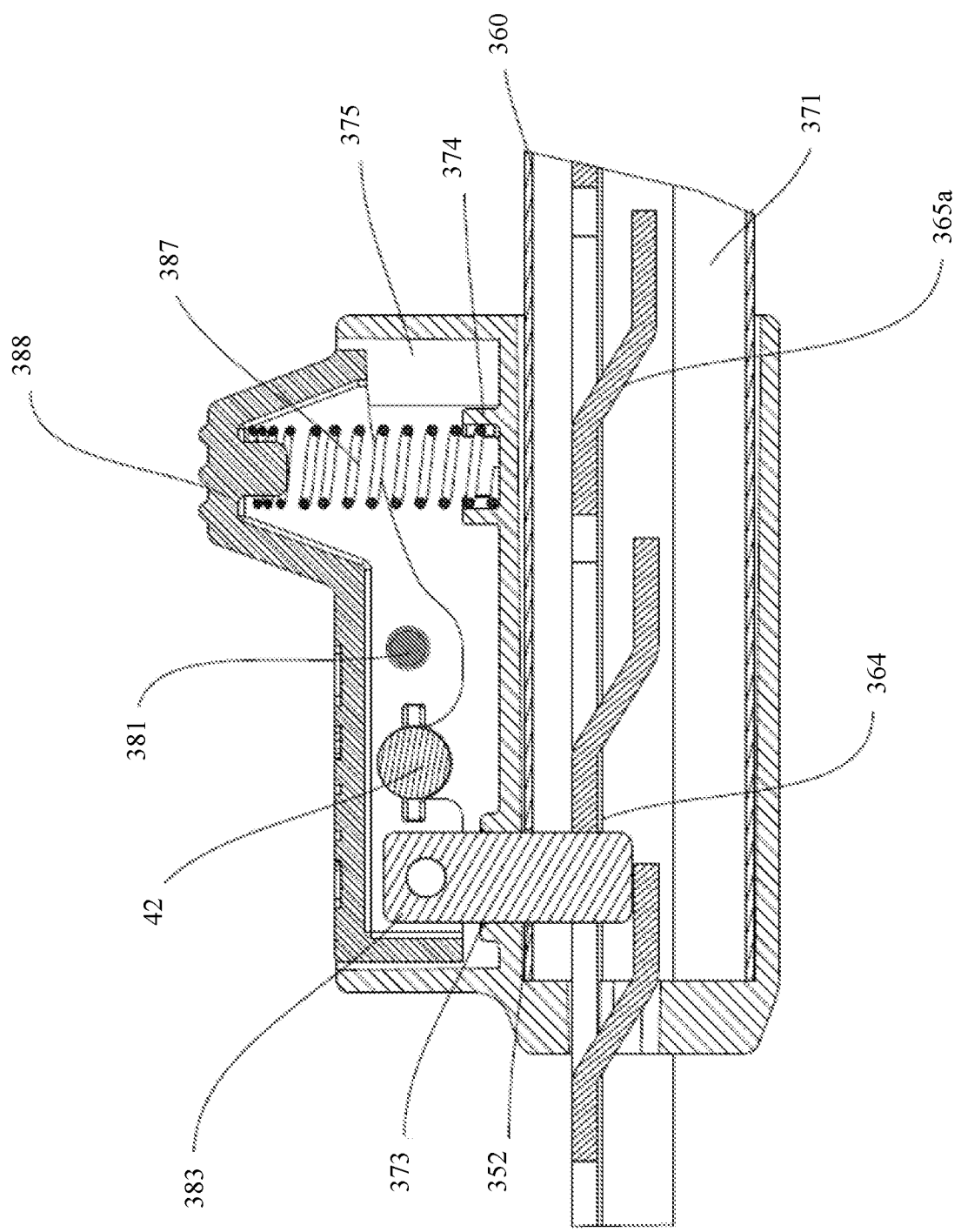
FIG. 7G is an enlarged view taken along circle B1 of FIG. 7F.
Figure 7H:
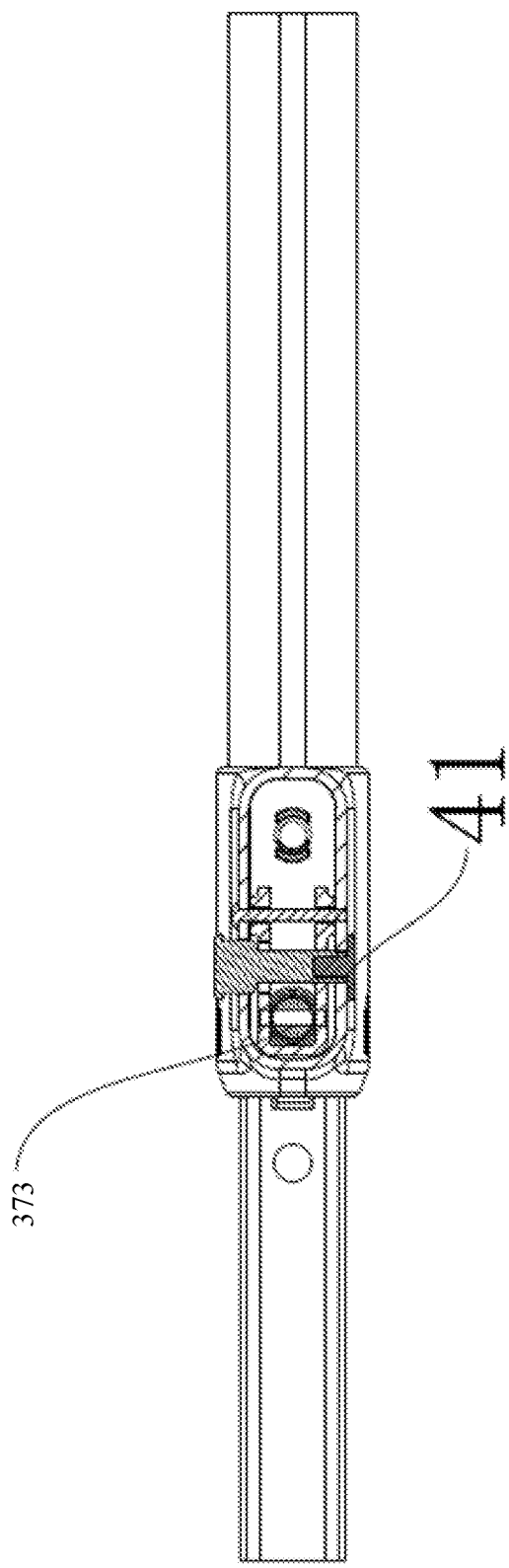
FIG. 7H is a second schematic cross-sectional view illustrating the exemplary adjustable bar of FIG. 7A in a locked state in accordance with exemplary embodiments of the present disclosure.

More specifically, referring to FIGS. 7F-7H, when a fixed length of the adjustable bar is desired, locking pin 383 is disposed such that its free end passes hole 373 of base 371 and first restriction hole 352 of the outer tubular bar and then enters into a restriction member (e.g., second restriction hole 361 or restriction slot 364 of a one-way restriction structure) of the inner bar. When the locking pin is inserted into the first restriction hole of the outer tubular bar and the restriction member of the inner bar, side slot 112b of the first fixation hole of the casing and side slot 123 of the first recess of the lever are aligned with each other. At this state, lug 42a of the fixation pin is inserted into the side slots of the casing and level. In embodiments where the first and second portions of the fixation pin are elastically coupled with each other, insertion of lug 42a into the side slots of the casing and level may be done automatically by the elastic force between the first and second portions of the fixation pin, or by manually pulling the second portion of the fixation pin. With lug 42a inserted into the side slots of the casing and level, the fixation pin restrictions the lever from moving with respect the casing and consequently restricts the locking pin from releasing from the restriction member of the inner bar. With the free end of the locking pin remained in the restriction member of the inner bar, the inner bar is restricted from moving with respect to the outer bar in at least one direction (e.g., restricted from moving in a direction that could cause undesired folding or collapsing of a structure). This significantly enhances the safety of adjustable bars and structures using such adjustable bars.

Figure 7I:
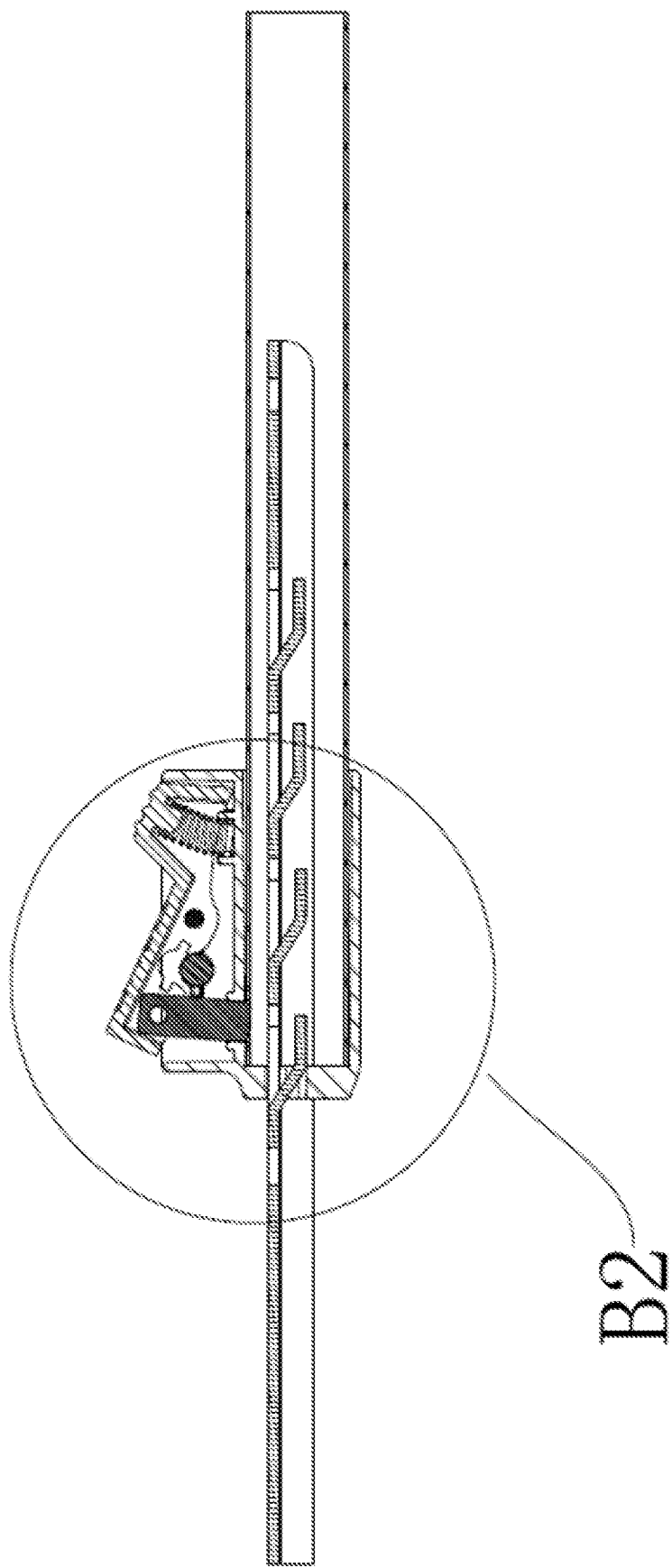
FIG. 7I is a first schematic cross-sectional view illustrating the exemplary adjustable bar of FIG. 7A in an unlocked state in accordance with exemplary embodiments of the present disclosure.
Figure 7J:
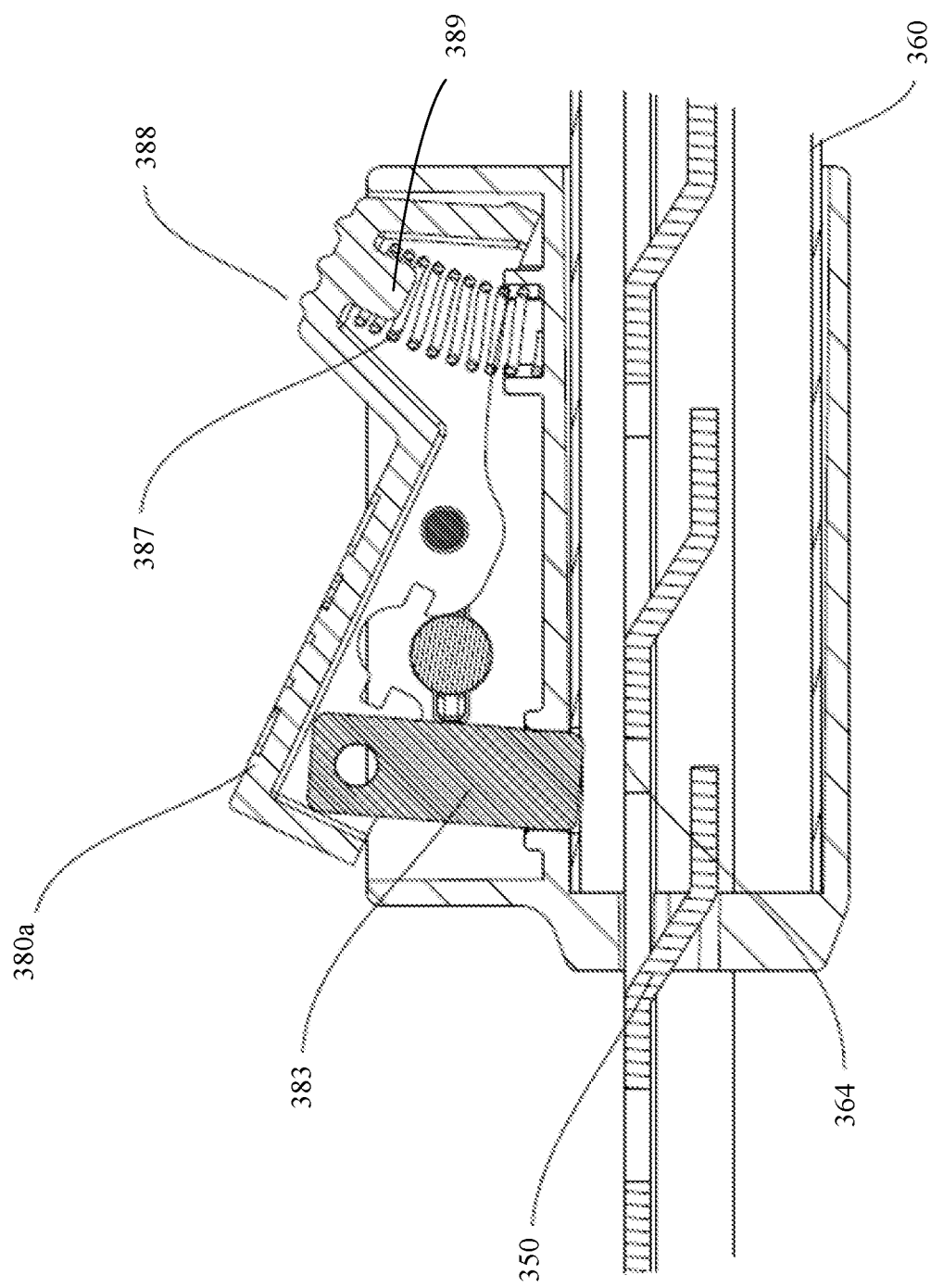
FIG. 7J is an enlarged view taken along circle B2 of FIG. 7I.
Figure 7K:
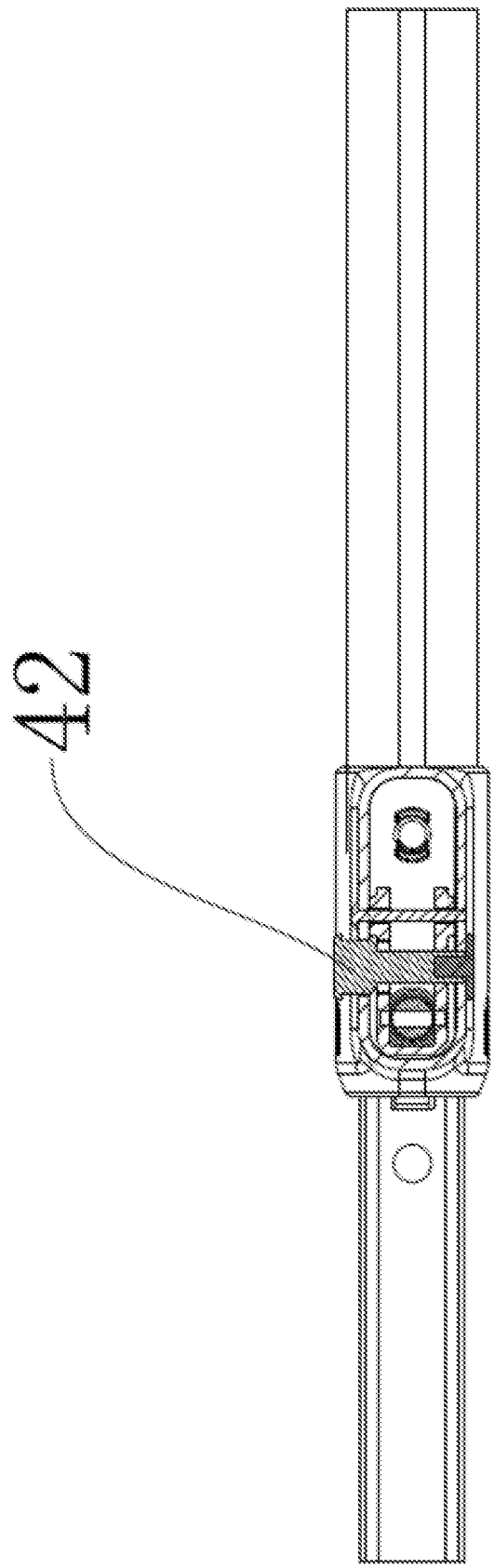
FIG. 7K is a second schematic cross-sectional view illustrating the exemplary adjustable bar of FIG. 7A in an unlocked state in accordance with exemplary embodiments of the present disclosure.

Referring to FIGS. 7I-7K, when adjusting the length of the adjustable bar is desired, lug 42a is removed from the side slot of the lever and/or from the side slot of the casing, for instance, by pulling the first portion or pushing the second portion of the fixation pin. At this state, the lever is disengaged from the fixation pin. Rotating the lever with respect to the casing, for instance, by pressing the second portion of the lever toward the base, will pull the free end of locking pin 383 out of the restriction member of the inner bar or out of both the restriction member of the inner bar and the first restriction hole of the outer tubular bar. This disengages the inner bar from the outer tubular bar, and thus allows the inner bar to move in both directions along the length direction of the outer tubular bar.

As the lever rotates, the second portion of the lever (e.g., protrusion 388) contacts elastic member 387, which forms a resistance to the rotation of the lever. When the lever rotates to a certain angle, the elastic force of the elastic member counteracts the pressing force and the lever stops rotating. This ensures the stability and reliability of the locking/unlocking mechanism. In some exemplary embodiments, a pillar such as pillar 389 is formed at the inner side of protrusion 388 at the second portion of the lever. As the lever rotates, for instance by pressing protrusion 388 toward the base, pillar 389 contacts elastic member 387.

Referring to FIGS. 8A-8H, in some exemplary embodiments, locking pin 383 includes a protruded step such as protruded step 383a at the free end of the locking pin. While protruded step 383a is shown in a generally ring shape, it should be noted that the protruded step can have any suitable shapes. For instance, the protruded step can be a segment of a ring. The protruded step is configured to be inserted into a gap such as gap 365c formed between first wall 360a of the inner bar and restriction tongue 365. For instance, in the illustrated embodiments, restriction tongue 365 is integrally formed or connected with distal edge 367 of restriction slot 364 and curved inwardly with respect to first wall 360a of the inner bar along the length direction of the inner bar toward proximal edge 366 of restriction slot 364. As such, gap 365c is formed at proximal edge 366 between first wall 360a of the inner bar and restriction tongue 365. When coupled with the gap, the protruded step of the locking pin prevents accidental release of the locking pin from the one-way restriction structure of the inner bar and thus enhances the safety of adjustable bars and structures using such adjustable bars.

Figure 8A:
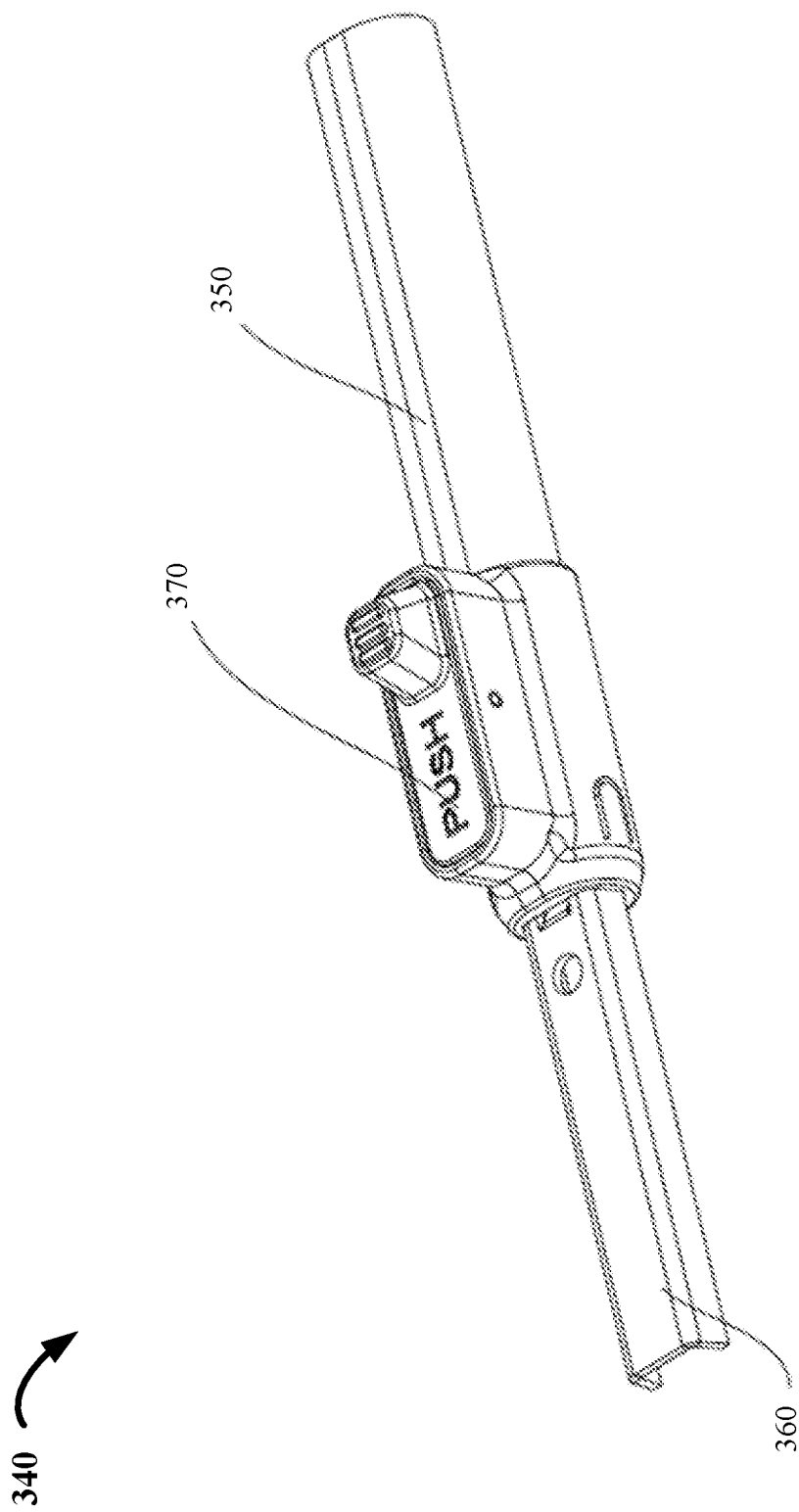
FIG. 8A is a perspective view illustrating an exemplary adjustable bar in accordance with exemplary embodiments of the present disclosure.
Figure 8B:
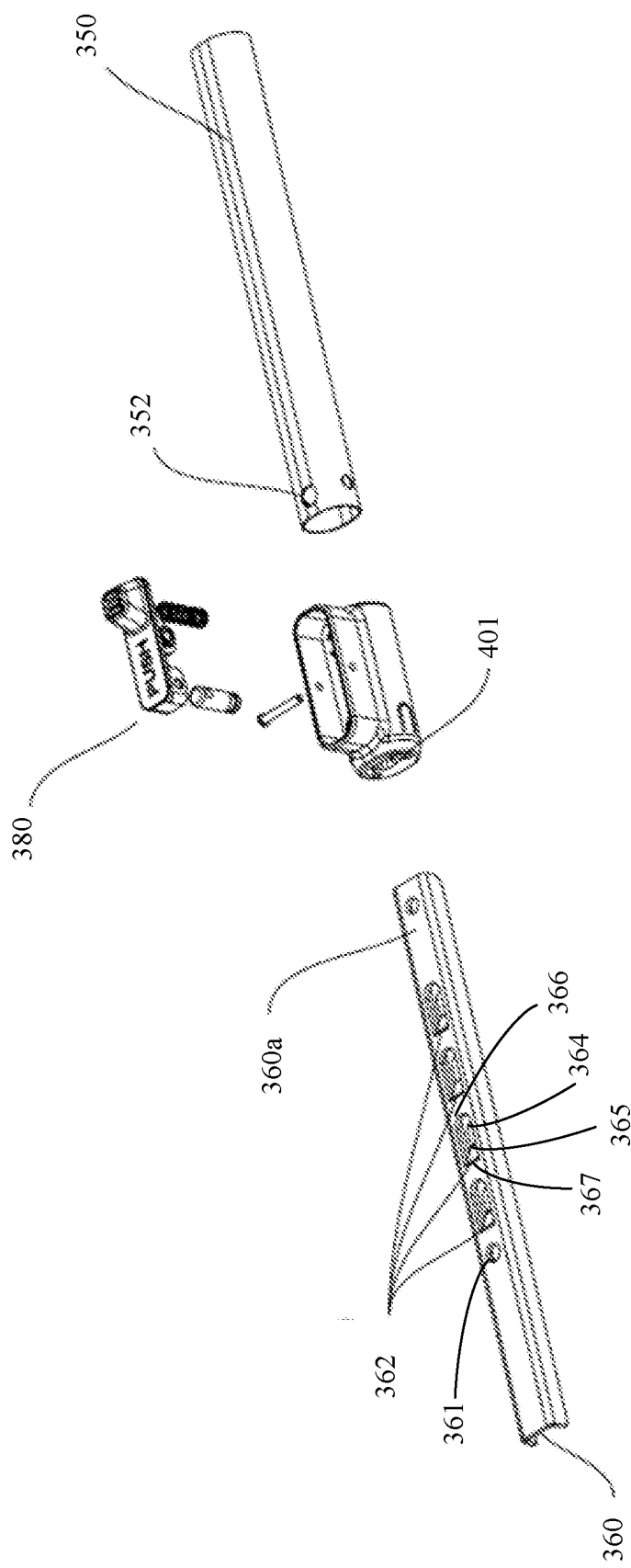
FIG. 8B is a disassembled view illustrating the exemplary adjustable bar of FIG. 8A.
Figure 8C:
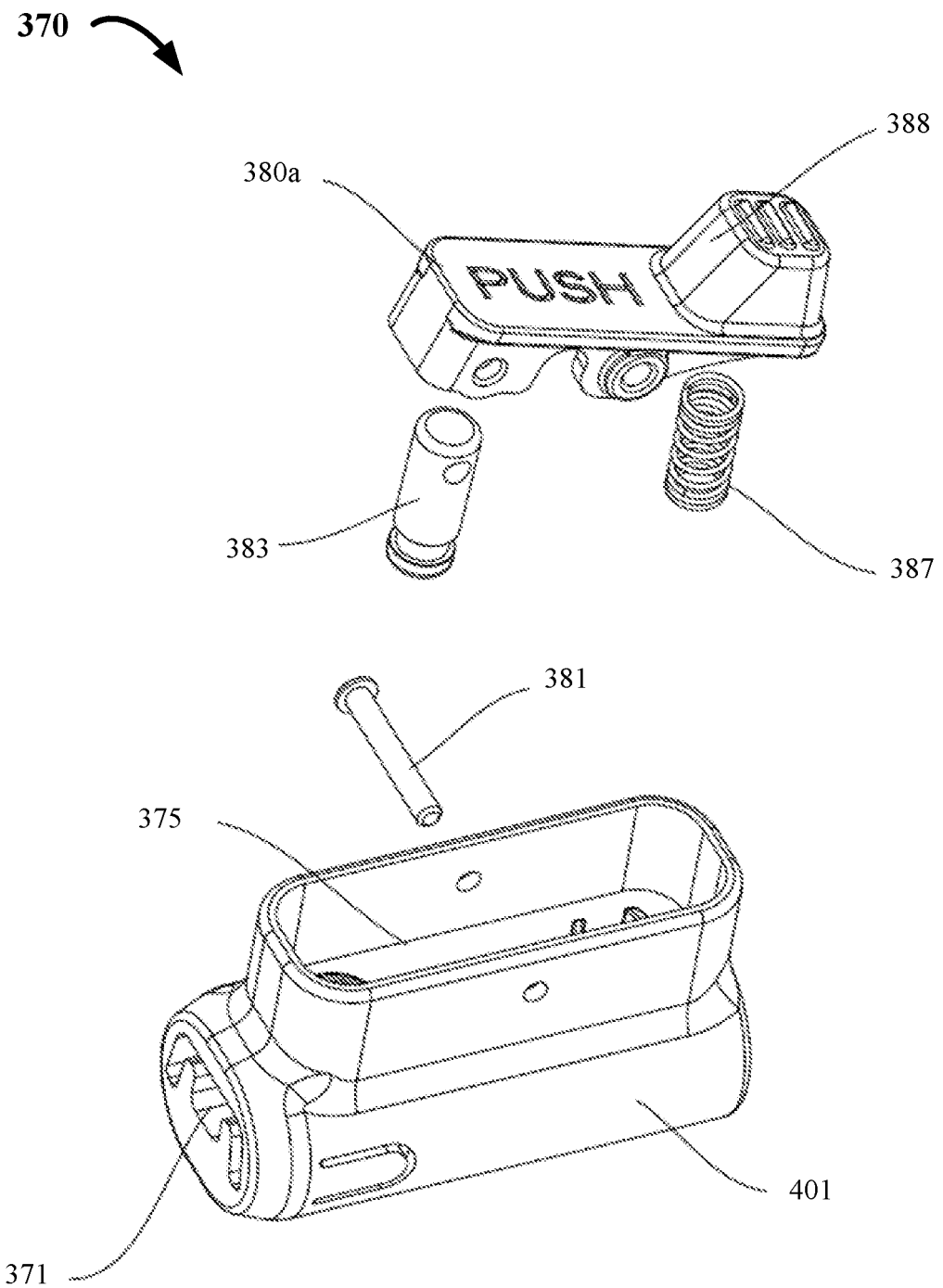
FIG. 8C is disassembled view illustrating an exemplary locking/unlocking mechanism in accordance with exemplary embodiments of the present disclosure.
Figure 8D:
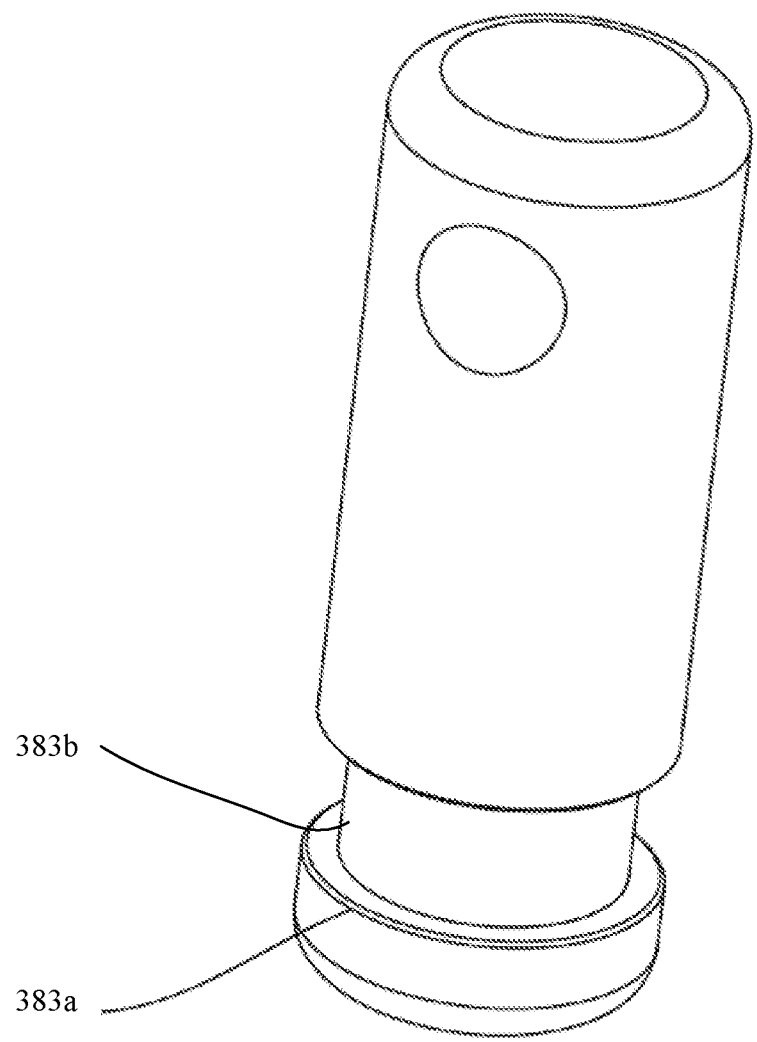
FIG. 8D is a perspective view illustrating a component of the exemplary locking/unlocking mechanism of FIG. 8C in accordance with exemplary embodiments of the present disclosure.
Figure 8E:
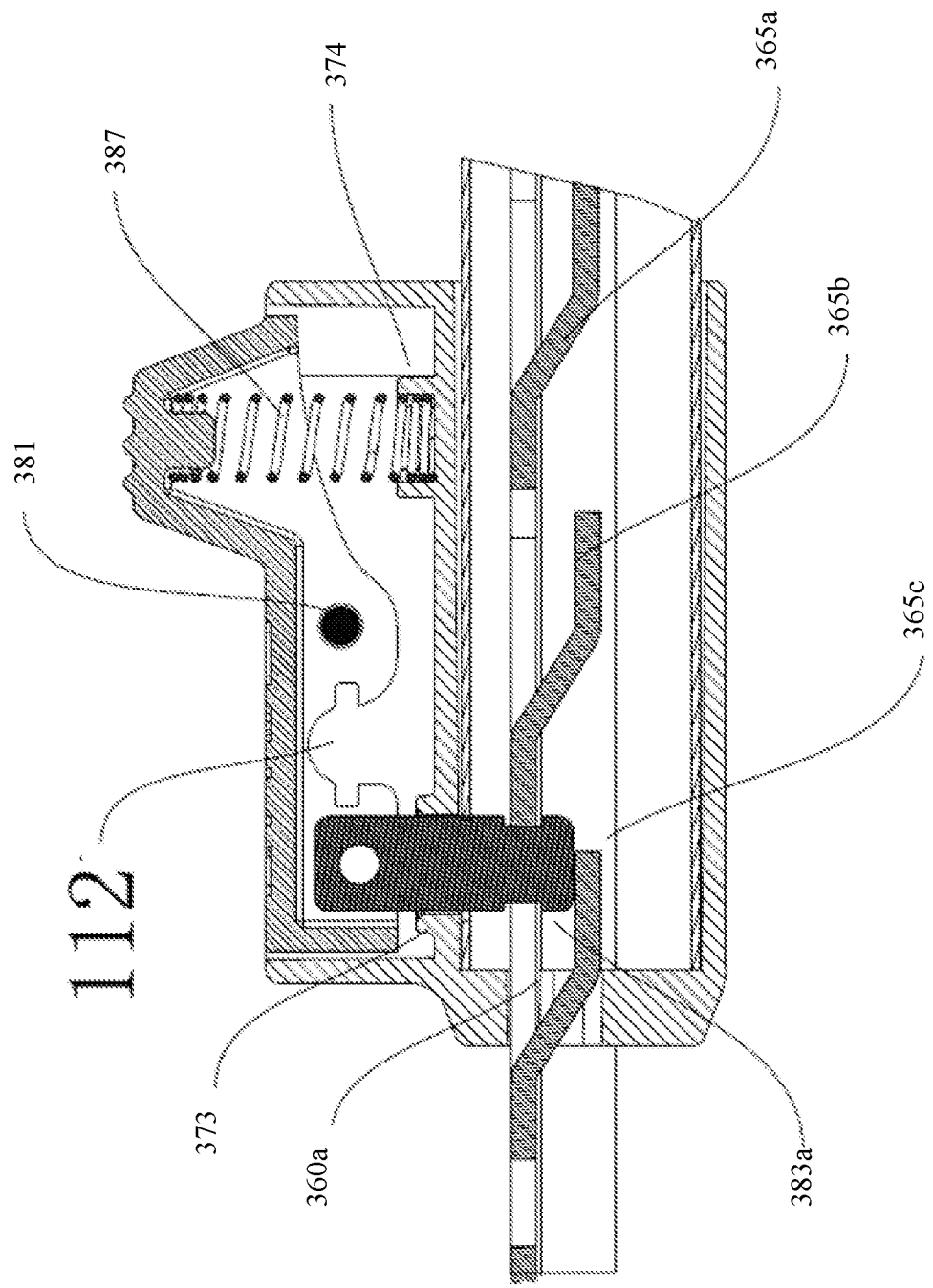
FIG. 8E is a first schematic cross-sectional view illustrating the exemplary adjustable bar of FIG. 8A in a locked state in accordance with exemplary embodiments of the present disclosure.
Figure 8F:
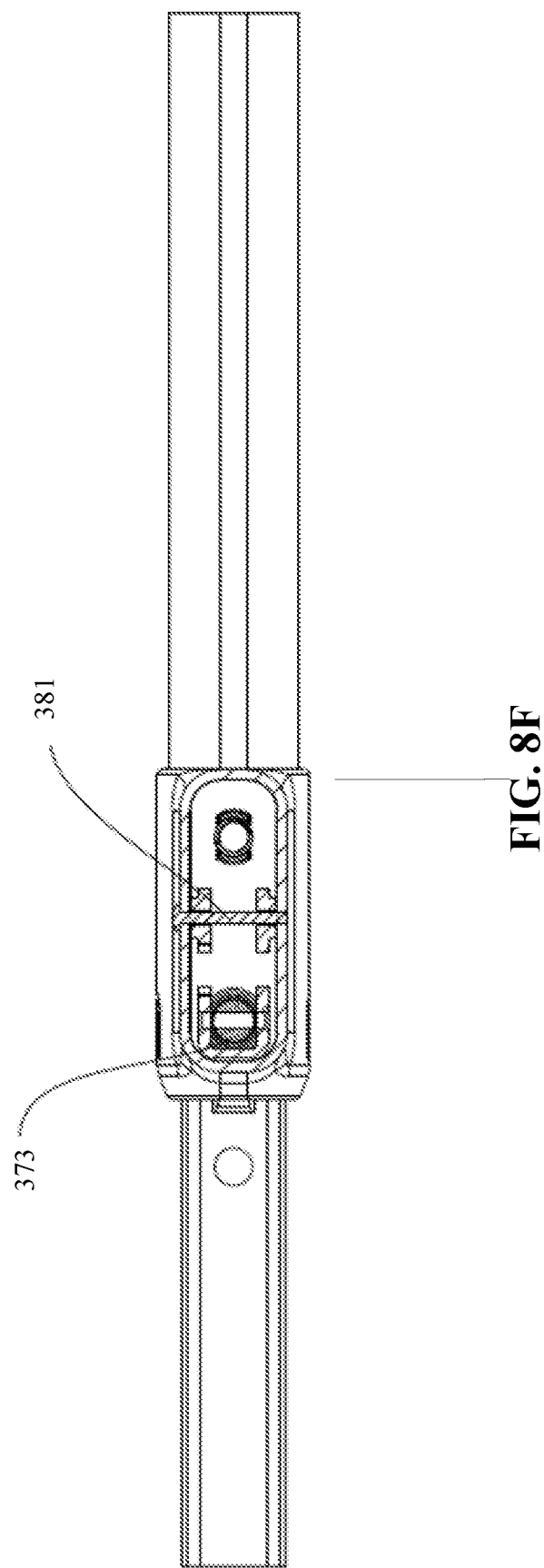
FIG. 8F is a second schematic cross-sectional view illustrating the exemplary adjustable bar of FIG. 8A in a locked state in accordance with exemplary embodiments of the present disclosure.
Figure 8G:
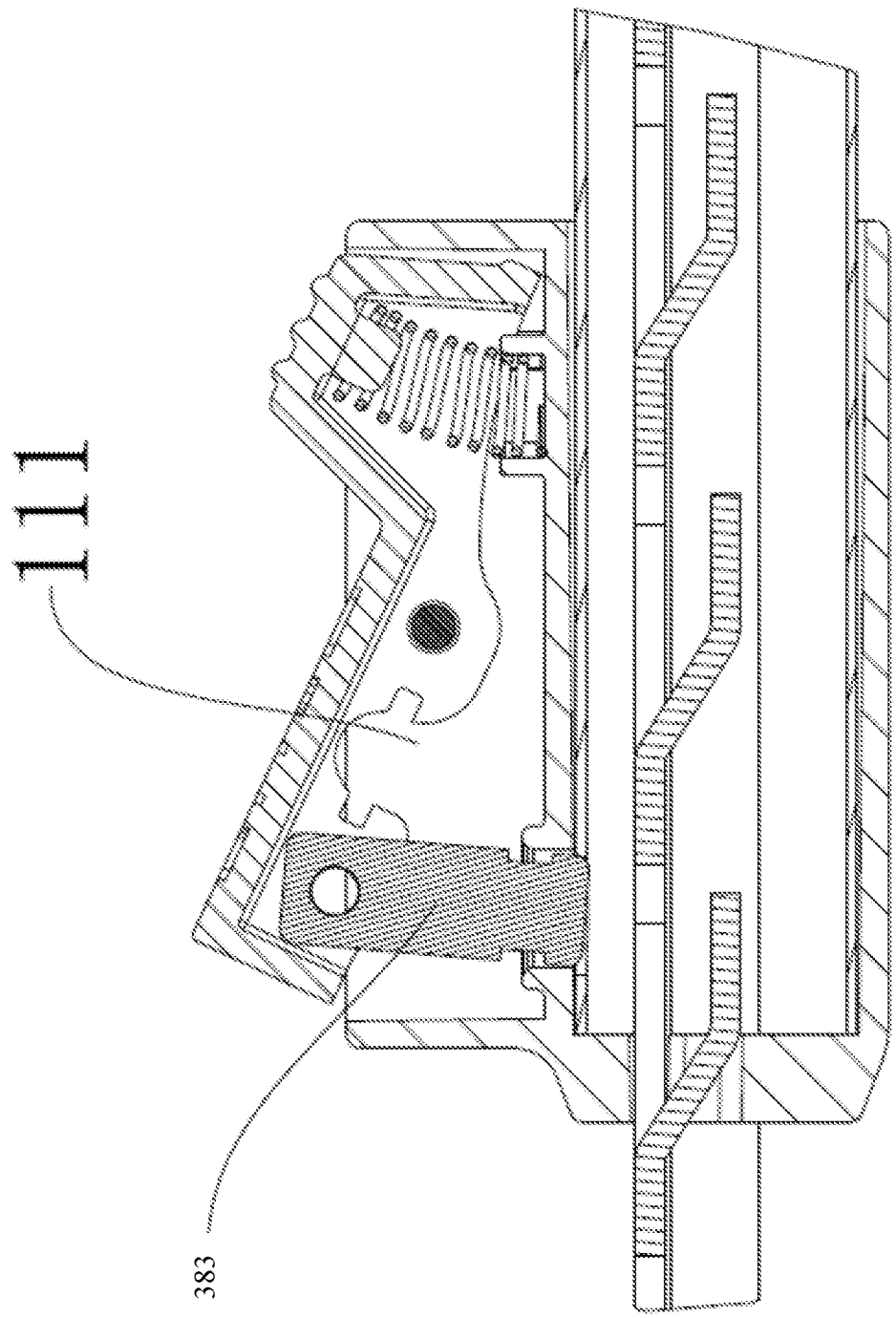
FIG. 8G is a first schematic cross-sectional view illustrating the exemplary adjustable bar of FIG. 8A in an unlocked state in accordance with exemplary embodiments of the present disclosure.
Figure 8H:
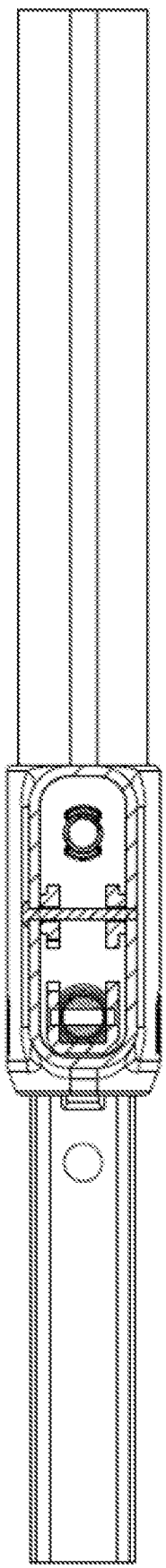
FIG. 8H is a second schematic cross-sectional view illustrating the exemplary adjustable bar of FIG. 8A in an unlocked state in accordance with exemplary embodiments of the present disclosure.

In some exemplary embodiments, the locking pin includes a groove such as groove 383b adjacent the protruded step. The groove is configured to receive the first wall of the inner bar. For instance, in the embodiment as illustrated in FIG. 8E, the groove receives the first wall of the inner bar at the proximal edge of the restriction slot. Similar to the protruded step, the groove can be but does not have to be of a generally ring shape.

In embodiments such as those illustrated in FIGS. 7A-7K and 8A-8H, restriction tongue 365 is integrally formed or connected with distal edge 367 of restriction slot 364 and curved inwardly with respect to first wall 360a of the inner bar along the length direction of the inner bar toward proximal edge 366 of restriction slot 364. In such embodiments, even with the locking pin inserted into a restriction structure, the inner bar is allowed to move toward the outer tubular bar along the length direction of the outer tubular bar but restricted from moving away from the outer tubular bar along the length direction of the outer tubular bar. In other words, even with the locking pin inserted into a restriction structure, the adjustable bar is allowed to contract (reducing its length) but prohibited from expanding (increasing its length).

In some exemplary embodiments, instead of being integrally formed or connected with distal edge 367 of restriction slot 364, restriction tongue 365 is integrally formed or connected with proximal edge 366 of restriction slot 364 and curved inwardly with respect to first wall 360a of the inner bar along the length direction of the inner bar toward distal edge 367 of restriction slot 364. In these embodiments, even with the locking pin inserted into a restriction structure, the inner bar is allowed to move away from the outer tubular bar along the length direction of the outer tubular bar but restricted from moving toward the outer tubular bar along the length direction of the outer tubular bar. In other words, even with the locking pin inserted into a restriction structure, the adjustable bar is allowed to expand (increasing its length) but prohibited from contracting (reducing its length).

For instance, FIGS. 9A-9E illustrate an exemplary adjustable bar substantially the same as that illustrated in FIGS. 7A-7K, except the exemplary adjustable bar in FIGS. 9A-9E has restriction tongue 365 integrally formed or connected with proximal edge 366 of restriction slot 364 and curved inwardly with respect to first wall 360a of the inner bar along the length direction of the inner bar toward distal edge 367 of restriction slot 364. This can be achieved by a variety of ways, for instance, by flipping the inner bar over and inserting the previous distal end of the inner bar into the outer bar.

Figure 10A:
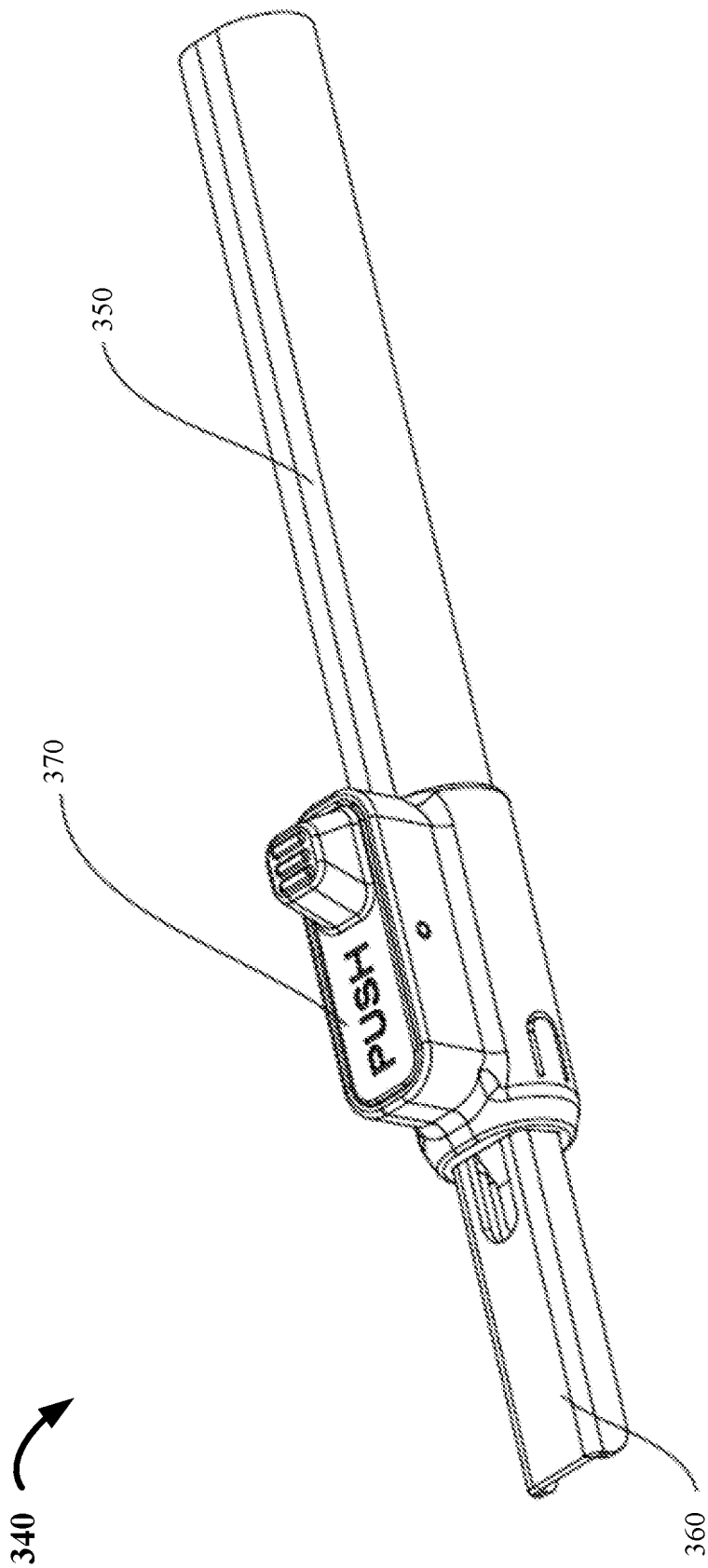
FIG. 10A is a perspective view illustrating an exemplary adjustable bar in accordance with exemplary embodiments of the present disclosure.
Figure 10B:
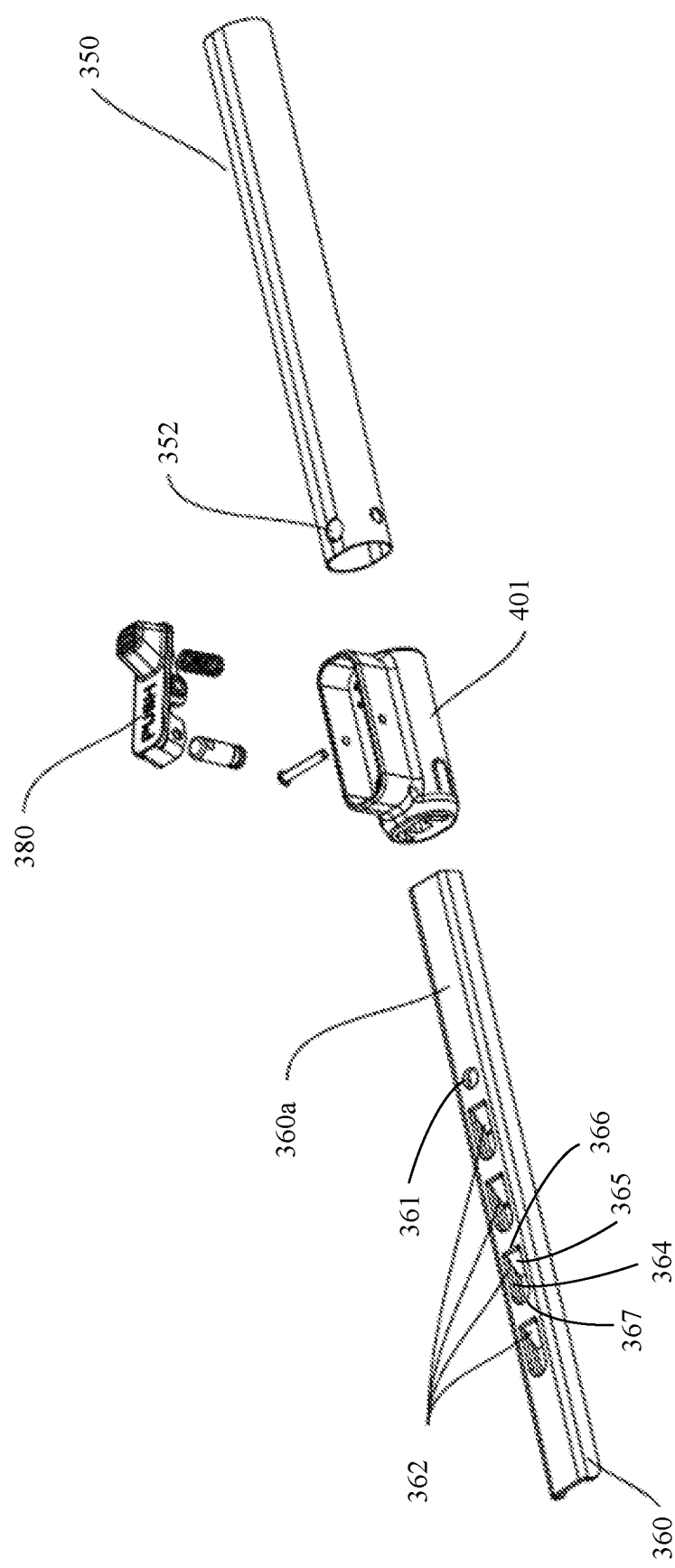
FIG. 10B is a disassembled view illustrating the exemplary adjustable bar of FIG. 10A.
Figure 10C:
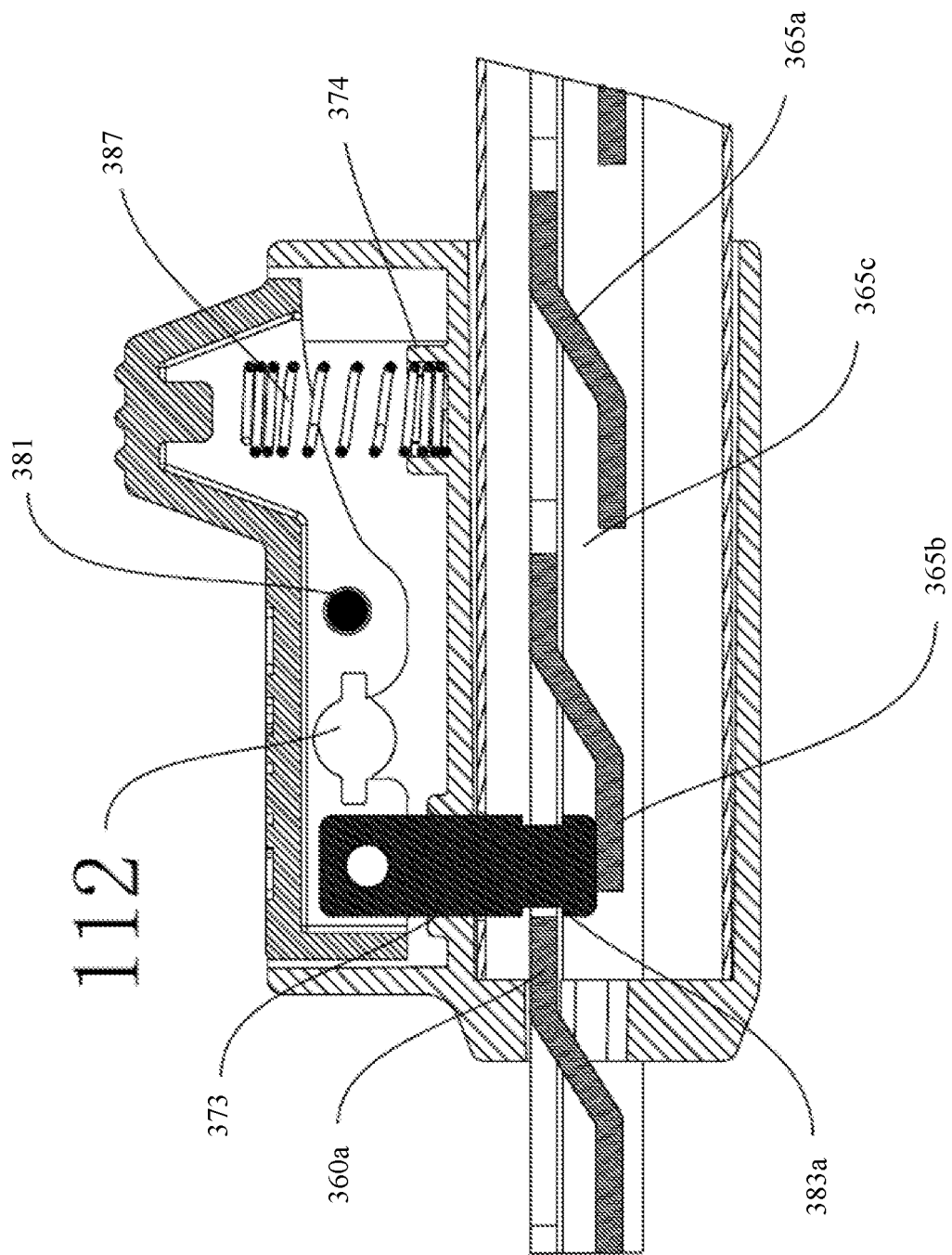
FIG. 10C is a first schematic cross-sectional view illustrating the exemplary adjustable bar of FIG. 10A in a locked state in accordance with exemplary embodiments of the present disclosure.
Figure 10D:
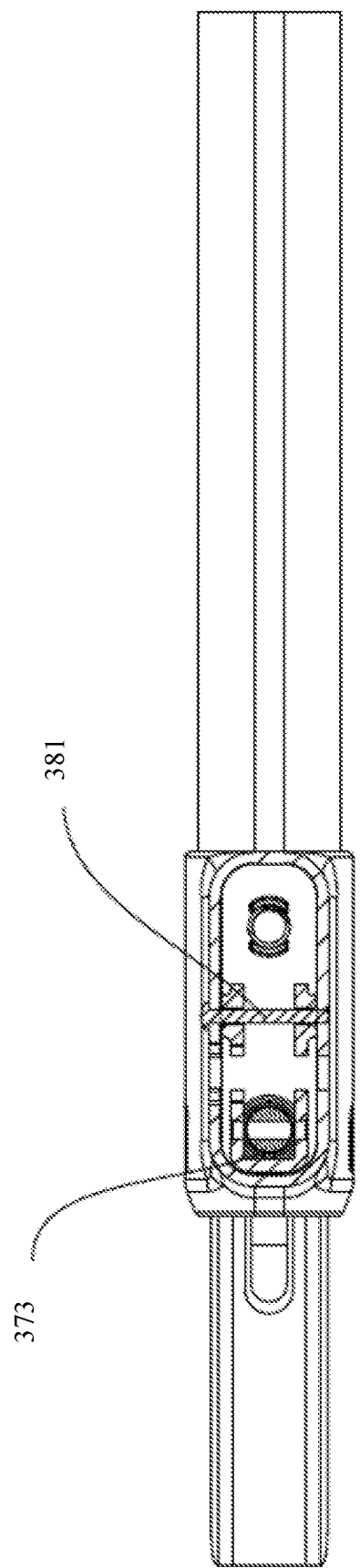
FIG. 10D is a second schematic cross-sectional view illustrating the exemplary adjustable bar of FIG. 10A in a locked state in accordance with exemplary embodiments of the present disclosure.

FIGS. 10A-10D illustrate an exemplary adjustable bar substantially the same as that illustrated in FIGS. 8A-8H, except the exemplary adjustable bar in FIGS. 10A-10D has restriction tongue 365 integrally formed or connected with proximal edge 366 of restriction slot 364 and curved inwardly with respect to first wall 360a of the inner bar along the length direction of the inner bar toward distal edge 367 of restriction slot 364. As such, gap 365c is formed at distal edge 367 between first wall 360a of the inner bar and restriction tongue 365. As illustrated in FIG. 10C, when coupled with gap 365c formed at distal edge 367 between first wall 360a of the inner bar and restriction tongue 365, protruded step 383a of the locking pin prevents accidental release of the locking pin from the one-way restriction structure of the inner bar.

The adjustable bars of the present disclosure can be used in a variety of structures. For instance, in some exemplary embodiments, the structure includes a first support, a second support, and one or more adjustable bars disclosed herein. The one or more adjustable bars are disposed substantially perpendicular to a height direction of the structure. Each adjustable bar in the one or more adjustable bars has a first end connected with the first support and a second end connected with the second support such that changing a length of the adjustable bar changes a height of the structure. When the locking pin is inserted into the first restriction hole of the outer tubular bar and any one of the plurality of restriction members of the inner bar, reducing the height of the structure is restricted. An example of such a structure is a table illustrated in FIGS. 1-4.

In some exemplary embodiments, a structure includes a first assembly, a second assembly, and one or more adjustable bars disclosed herein. The first and second assemblies are pivotally connected with each other. Each adjustable bars in the one or more adjustable bars has a first end connected with the first assembly and a second end connected with the second assembly. When the locking pin is inserted into the first restriction hole of the outer tubular bar and any one of the plurality of restriction members of the inner bar, the first and second assemblies are restricted from moving with respect to each other in at least one direction.

Figure 11:
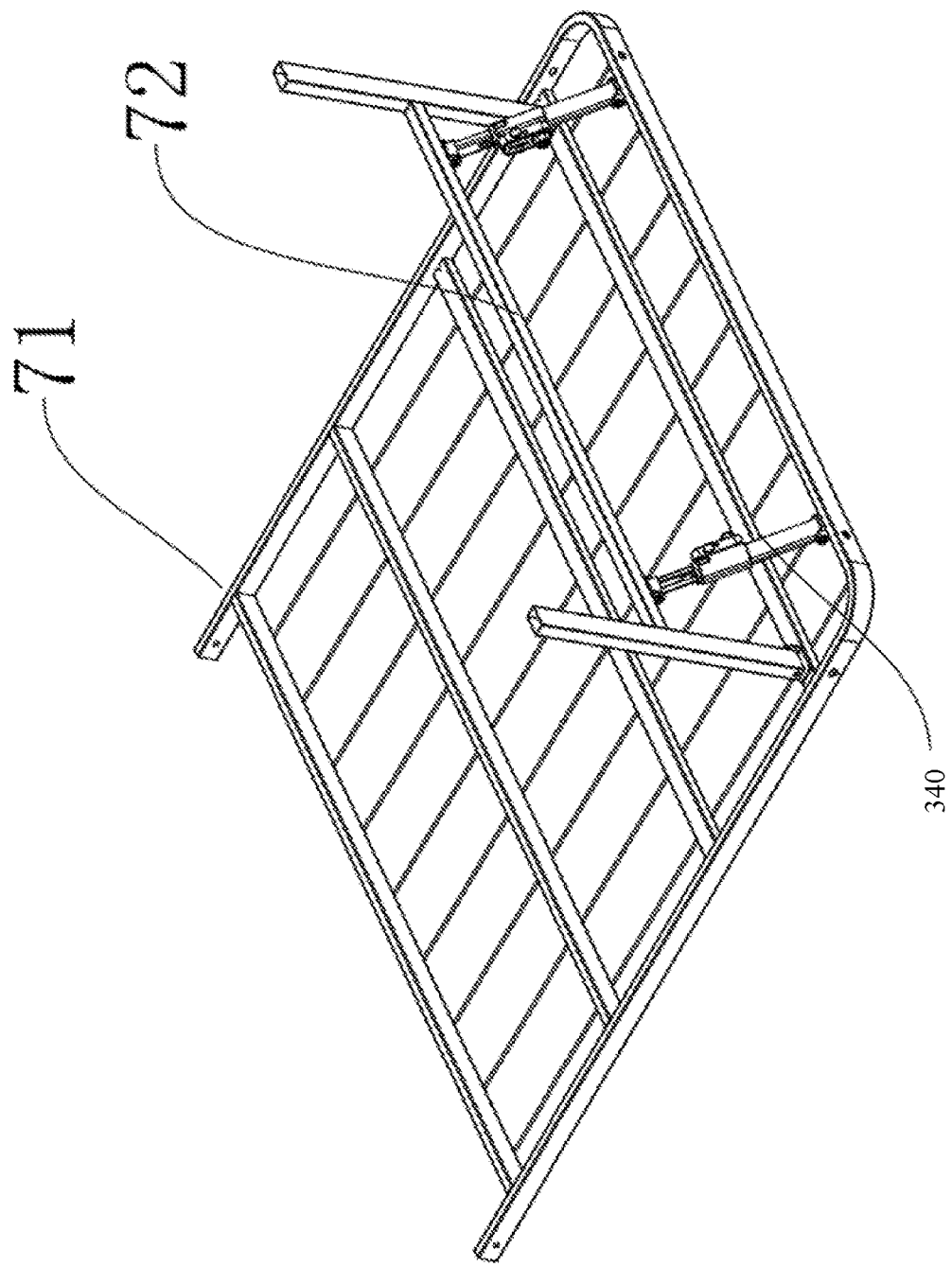
FIG. 11 is a perspective view illustrating a usage of an exemplary adjustable bar in accordance with exemplary embodiments of the present disclosure.

For instance, by way of example, FIG. 11 illustrates a bed including a first assembly such as frame assembly 71 and a second assembly such as leg assembly 72. The leg assembly is pivotally connected with the frame assembly such that the leg assembly can rotate toward (e.g., folding) or away from (e.g., unfolding) the frame assembly. The bed also includes two adjustable bars each having a first end connected with the frame assembly and a second end connected with the leg assembly. When the locking pin is inserted into the first restriction hole of the outer tubular bar and any one of the plurality of restriction members of the inner bar, the frame and leg assemblies are restricted from moving with each other in at least one direction. For instance, in some exemplary embodiments, with the locking pin inserted into a restriction structure, the adjustable bar is allowed to contract (reducing its length), thereby allowing the leg assembly to rotate away from the frame assembly and unfold. This makes it easy to set up the beds. The adjustable bar, however, is prohibited from expanding (increasing its length), thereby preventing the leg assembly to rotate toward the frame assembly and thus preventing accidental folding of the leg assembly and collapsing of the bed. This ensures the safety of the beds.

The present disclosure discloses several means to prevent accidental release of the locking pin from a restriction member (e.g., second restriction hole or restriction slot of a one-way restriction structure) of the inner bar, including cover 390, fixation pin 41 and 42, and protruded step 383a formed at locking pin 383. These features can be used alone or in any combination. For instance, the locking pin with a protruded step can be used in a locking/unlocking mechanism with or without a fixation pin, with or without a fixation hole formed at the casing, and with or without a recess formed at the lever. The locking pin with a protruded step can also be used with or without a cover.

The adjustable bars and structures such as leg assemblies, tables and beds of the present disclosure have several advantages. For instance, due to at least in part the configurations of the one-way restriction structure(s) of the inner bar and the scissor lift formed by the first and second support, the leg assembly can expand (e.g., increase the length of the leg assembly) without any additional restrictions. In other words, unfolding of the table or increasing the height of the table can be achieved by simply lifting the tabletop. Similarly, due to at least in part the configurations of the one-way restriction structure(s) of the inner bar, the leg assemble of the bed can be unfolded easily without any additional restrictions. As such, the tables and beds of the present disclosure are very convenient to use. Moreover, the locking/unlocking mechanism includes additional protections such as a cover, a fixation pin and/or a locking pin with a protruded step to keep the locking pin in position. As such, accidental folding of the tables and beds is prevented, and thus the tables and beds of the present disclosure are safer to use.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "top" or "bottom", "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first bar could be termed a second bar, and, similarly, a second bar could be termed a first bar, without changing the meaning of the description, so long as all occurrences of the "first bar" are renamed consistently and all occurrences of the "second bar" are renamed consistently.

What is claimed is:

1. An adjustable bar comprising:
an outer tubular bar comprising a first restriction hole formed on a first wall of the outer tubular bar;
an inner bar comprising:
a proximal end disposed inside the outer tubular bar;
a distal end disposed outside of the outer tubular bar; and
a plurality of restriction members formed at a first wall of the inner bar between the proximal end and distal end of the inner bar and spaced apart along a length direction of the inner bar; and
a locking/unlocking mechanism configured to control movement of the inner bar with respect to the outer tubular bar, the locking/unlocking mechanism comprising:
a base fixedly coupled with the outer tubular bar;
a casing integrally formed or coupled with the base;
a lever pivotally connected with the casing;
a locking pin integrally formed or coupled with the lever, wherein the locking pin is selectively inserted into the first restriction hole of the outer tubular bar and any one respective restriction member in the plurality of restriction members of the inner bar, thereby selectively restricting movement of the inner bar with respect to the outer tubular bar; and
a fixation pin to selectively restrict movement of the lever with respect the casing when the locking pin is inserted into the first restriction hole of the outer tubular bar and the respective restriction member of the inner bar, thereby preventing accidental release of the locking pin from the respective restriction member of the inner bar.

2. The adjustable bar of claim 1, wherein:
the casing comprises a first fixation hole at a first side thereof, the first fixation hole comprising a main section and one or more side slots connected with the main section;
the lever comprises a first recess at a first side thereof and one or more side slots connected with the first recess; and
the fixation pin is movably coupled with the first fixation hole of the casing, and comprises one or more lugs configured to be selectively inserted into the one or more side slots of the first fixation hole of the casing and the one or more side slots of the first recess of the lever,
wherein when the one or more lugs of the fixation pin are inserted into the one or more side slots of the first fixation hole of the casing and the one or more side slots of the lever, the lever is restricted from moving with respect to the casing, and when the one or more lugs of the fixation pin are removed from the one or more side slots of the lever, the first recess of the lever allows the lever to disengage from the fixation pin and to rotate with respect to the casing.

3. The adjustable bar of claim 2, wherein:
the casing comprises a second fixation hole at a second side thereof; and
the fixation pin comprises a first portion movably coupled with the first fixation hole of the casing and a second portion coupled with the second fixation hole,
wherein the first and second portions of the fixation pin are elastically coupled with each other to allow the one or more lugs of the fixation pin to pull out of the one or more side slots of the lever, thereby allowing the level to disengage from the fixation pin.

4. The adjustable bar of claim 3, wherein the lever comprises a second recess at a second side thereof to receive at least a portion of the fixation pin cross-sectional-wise.

5. The adjustable bar of claim 1, wherein the plurality of restriction members comprises a second restriction hole formed at the first wall of the inner bar.

6. The adjustable bar of claim 1, wherein the plurality of restriction members comprises one or more one-way restriction structures, each respective one-way restriction structure in the one or more one-way restriction structures comprising:
a restriction slot formed at the first wall of the inner bar and comprising a proximal edge toward the proximal end of the inner bar and a distal edge toward the distal end of the inner bar; and
a restriction tongue integrally formed or connected with one of the proximal and distal edges of the restriction slot and curved inwardly with respect to the first wall of the inner bar along the length direction of the inner bar toward the other of the proximal and distal edges of the restriction slot.

7. The adjustable bar of claim 6, wherein the restriction tongue is integrally formed or connected with the distal edge of the restriction slot and curved inwardly with respect to the first wall of the inner bar along the length direction of the inner bar toward the proximal edge of the restriction slot, wherein each one-way restriction structure in the one or more one-way restriction structures of the inner bar restricts the inner bar from moving away from the outer tubular bar along the length direction of the outer tubular bar but allows the inner bar to move toward the outer tubular bar along the length direction of the outer tubular bar.

8. The adjustable bar of claim 6, wherein the locking pin comprises a protruded step at a free end thereof configured to be inserted into a gap formed at the other of the proximal and distal edges of the restriction slot between the first wall of the inner bar and the restriction tongue, thereby preventing accidental release of the locking pin from each respective one-way restriction structure of the inner bar.

9. The adjustable bar of claim 8, wherein the locking pin comprises a groove adjacent the protruded step to receive the first wall of the inner bar at the other of the proximal and distal edges of the restriction slot.

10. The adjustable bar of claim 1, wherein:
the base comprises a base hole and a base pillar formed at a first side wall of the base, wherein the base hole is aligned with the first restriction hole of the outer tubular bar;
the casing is integrally formed or coupled with the first side wall of the base and surrounds the base hole and the base pillar; and
the lever comprises a first end portion aligned with the base hole, a second end portion aligned with the base pillar, and a middle portion between the first and second portions and pivotally connected with the casing, wherein the locking pin is integrally formed or coupled with the first end portion of the level, and has a free end toward the base hole.

11. The adjustable bar of claim 10, wherein the locking/unlocking mechanism further comprises:
an elastic member engaged with the base pillar, and having a first end abutting the first side wall of the base and a second end abutting the second portion of the lever, wherein when a restriction member in the plurality of restriction members of the inner bar aligns with the first restriction hole of the outer tubular bar, the elastic member pushes the locking pin into the restriction member of the inner bar.

12. A structure comprising:
a first support;
a second support; and
one or more adjustable bars of claim 1 disposed substantially perpendicular to a height direction of the structure, each adjustable bar in the one or more adjustable bars having a first end connected with the first support and a second end connected with the second support such that changing a length of the adjustable bar changes a height of the structure,
wherein when the locking pin is inserted into the first restriction hole of the outer tubular bar and any one of the plurality of restriction members of the inner bar, reducing the height of the structure is restricted.

13. The structure of claim 12, further comprising a panel coupled with and supported by the first and second supports.

14. A structure comprising:
a first assembly;
a second assembly pivotally connected with the first assembly; and
one or more adjustable bars of claim 1, each having a first end connected with the first assembly and a second end connected with the second assembly,
wherein when the locking pin is inserted into the first restriction hole of the outer tubular bar and any one of the plurality of restriction members of the inner bar, the first and second assemblies are restricted from moving with respect to each other in at least one direction.

15. An adjustable bar comprising:
an outer tubular bar comprising a first restriction hole formed on a first wall of the outer tubular bar;
an inner bar comprising:
a proximal end disposed inside the outer tubular bar;
a distal end disposed outside of the outer tubular bar; and
a plurality of restriction members disposed between the proximal end and distal end of the inner bar and spaced apart along a length direction of the inner bar, wherein the plurality of restriction members comprises one or more one-way restriction structures, and each one-way restriction structure in the one or more one-way restriction structures comprises:
a restriction slot formed at a first wall of the inner bar and comprising a proximal edge toward the proximal end of the inner bar and a distal edge toward the distal end of the inner bar; and
a restriction tongue integrally formed or connected with one of the proximal and distal edges of the restriction slot and curved inwardly with respect to the first wall of the inner bar along the length direction of the inner bar toward the other of the proximal and distal edges of the restriction slot; and
a locking/unlocking mechanism configured to control movement of the inner bar with respect to the outer tubular bar, the locking/unlocking mechanism comprising a locking pin to be selectively inserted into the first restriction hole of the outer tubular bar and the restriction slot of any one of the one or more one-way restriction structures of the inner bar, thereby selectively restricting the inner bar from moving along the length direction of the outer tubular bar in one direction but allowing the inner bar to move along the length direction of the outer tubular bar in another direction, wherein
the locking pin comprises a protruded step at a free end thereof configured to be inserted into a gap formed at the other of the proximal and distal edges of the restriction slot between the first wall of the inner bar and the restriction tongue, thereby preventing accidental release of the locking pin from each respective one-way restriction structure of the inner bar.

16. The adjustable bar of claim 15, wherein the locking pin further comprises a groove adjacent the protruded step to receive the first wall of the inner bar at the other of the proximal and distal edges of the restriction slot.

17. The adjustable bar of claim 15, wherein the locking/unlocking mechanism further comprises:
a base comprising a base hole and a base pillar formed at a first side wall of the base, wherein the base hole is aligned with the first restriction hole of the outer tubular bar;
a casing integrally formed or coupled with the first side wall of the base and surrounding the base hole and the base pillar;
a lever comprising a first end portion aligned with the base hole, a second end portion aligned with the base pillar, and a middle portion between the first and second portions and pivotally connected with the casing, wherein the locking pin is integrally formed or coupled with the first end portion of the level, and has a free end toward the base hole; and
an elastic member engaged with the base pillar, and having a first end abutting the first side wall of the base and a second end abutting the second portion of the lever, wherein when the restriction slot of any one of the one or more one-way restriction structures of the inner bar aligns with the first restriction hole of the outer tubular bar, the elastic member pushes the locking pin into the restriction slot of the inner bar.

18. A structure comprising:
a first support;
a second support; and
one or more adjustable bars of claim 15, disposed substantially perpendicular to a height direction of the structure, each adjustable bar in the one or more adjustable bars having a first end connected with the first support and a second end connected with the second support such that changing a length of the adjustable bar changes a height of the structure, wherein when the locking pin is inserted into the first restriction hole of the outer tubular bar and any one of the plurality of restriction members of the inner bar, reducing the height of the structure is restricted.

19. The structure of claim 18, further comprising a panel coupled with and supported by the first and second supports.

20. A structure comprising:

a first assembly;

a second assembly pivotally connected with the first assembly; and one or more adjustable bars of claim 15, each having a first end connected with the first assembly and a second end connected with the second assembly, wherein when the locking pin is inserted into the first restriction hole of the outer tubular bar and any one of the plurality of restriction members of the inner bar, the first and second assemblies are restricted from moving with respect to each other in at least one direction.

* * * * *